United States Patent
Pjanic et al.

(10) Patent No.: US 9,531,914 B1
(45) Date of Patent: Dec. 27, 2016

(54) COLOR CHANGING EFFECTS WITH CROSS-HALFTONE PRINTS ON METAL

(71) Applicant: Roger D. Hersch, Epalinges (CH)

(72) Inventors: Petar Pjanic, Chavannes-près-Renens (CH); Roger D. Hersch, Epalinges (CH)

(73) Assignee: Ecole Polytechnique Fédérale de Lausanne, Lausanne (CH)

( * ) Notice: Subject to any disclaimer, the term of this patent is extended or adjusted under 35 U.S.C. 154(b) by 0 days.

(21) Appl. No.: 14/874,456

(22) Filed: Oct. 4, 2015

(51) Int. Cl.
| | |
|---|---|
| *H04N 1/52* | (2006.01) |
| *H04N 1/60* | (2006.01) |
| *G06K 15/02* | (2006.01) |
| *G06K 19/06* | (2006.01) |
| *H04N 1/387* | (2006.01) |
| *B42D 25/21* | (2014.01) |
| *B42D 25/30* | (2014.01) |
| *B42D 25/373* | (2014.01) |

(Continued)

(52) U.S. Cl.
CPC ............ *H04N 1/4056* (2013.01); *B41M 3/148* (2013.01); *B42D 25/21* (2014.10); *B42D 25/30* (2014.10); *B42D 25/373* (2014.10); *B42D 25/405* (2014.10); *B42D 25/45* (2014.10); *B44F 1/02* (2013.01); *B44F 1/10* (2013.01); *G06K 15/023* (2013.01); *G06K 15/1878* (2013.01); *G06K 15/1881* (2013.01); *G06K 15/1889* (2013.01); *G06K 19/06009* (2013.01); *G07D 7/122* (2013.01); *G09F 19/14* (2013.01); *H04N 1/00883* (2013.01); *H04N 1/32256* (2013.01); *H04N 1/32309* (2013.01); *H04N 1/3871* (2013.01); *H04N 1/52* (2013.01); *H04N 1/6008* (2013.01); *H04N 1/6016* (2013.01); *H04N 1/6058* (2013.01); *H04N 1/6088* (2013.01); *H04N 1/6097* (2013.01); *H04N 2201/3235* (2013.01); *H04N 2201/3242* (2013.01)

(58) Field of Classification Search
None
See application file for complete search history.

(56) References Cited

U.S. PATENT DOCUMENTS

| | | | |
|---|---|---|---|
| 7,054,038 B1 * | 5/2006 | Ostromoukhov | H04N 1/54 358/3.13 |
| 7,194,105 B2 * | 3/2007 | Hersch | G07D 7/0013 382/100 |

(Continued)

OTHER PUBLICATIONS

U.S. Appl. No. 14/747,184, filed Jun. 23, 2015, P. Pjanic, R. D. Hersch, "Color reproduction, pattern hiding and image alternations with halftone prints on metal".

(Continued)

*Primary Examiner* — Scott A Rogers

(57) ABSTRACT

We propose new methods for creating color varying prints with classical cyan, magenta, yellow inks on a metallic substrate. We use a special crossline halftone with optimized surface coverages of the inks to create color prints on a metallic surface whose colors change when rotating the print in-plane under specular reflection. These prints enable viewing on the same metallic print a first image with a first set of colors and upon in-plane rotation, the same image with parts colored with a different set of colors. They also enable viewing a first color image and upon rotation a second independent color image. Applications comprise counterfeit prevention, art, advertisement exhibitions and amusement parks.

20 Claims, 20 Drawing Sheets

(51) Int. Cl.
*B42D 25/405* (2014.01)
*B42D 25/45* (2014.01)
*B41M 3/14* (2006.01)
*B44F 1/02* (2006.01)
*B44F 1/10* (2006.01)
*G07D 7/12* (2016.01)
*G09F 19/20* (2006.01)
*H04N 1/405* (2006.01)
*H04N 1/32* (2006.01)
*H04N 1/00* (2006.01)
*G09F 19/14* (2006.01)

(56) References Cited

U.S. PATENT DOCUMENTS

| | | | | |
|---|---|---|---|---|
| 7,295,717 | B2 * | 11/2007 | Hersch | G04B 19/10 |
| | | | | 283/94 |
| 7,305,105 | B2 * | 12/2007 | Chosson | G07D 7/0013 |
| | | | | 380/258 |
| 8,085,438 | B2 | 12/2011 | Hersch et al. | |
| 8,351,087 | B2 * | 1/2013 | Amidror | B42D 25/29 |
| | | | | 358/3.28 |
| 8,355,169 | B2 * | 1/2013 | Hersch | B41M 3/144 |
| | | | | 283/92 |
| 8,610,958 | B2 * | 12/2013 | Rossier | H04N 1/4055 |
| | | | | 283/113 |
| 8,780,349 | B2 * | 7/2014 | Okumura | G01J 3/46 |
| | | | | 356/402 |
| 8,922,855 | B2 * | 12/2014 | Okumura | B41J 2/195 |
| | | | | 347/5 |
| 9,085,190 | B2 * | 7/2015 | Andres | G07D 7/122 |
| 2004/0233463 | A1 * | 11/2004 | Hersch | B41M 1/18 |
| | | | | 358/1.9 |
| 2013/0181435 | A1 * | 7/2013 | Hersch | H04N 1/6058 |
| | | | | 283/85 |

OTHER PUBLICATIONS

Pjanic, P. Hersch R. D., Color Imaging and Pattern Hiding on a Metallic Substrate, Proc. SIGGRAPH, ACM Trans. On Graphics 34 (3), article 130, (2015).

Pjanic, P. Hersch, R.D., Specular color imaging on a metallic substrate, In Proc. IS&T 21st Color Imaging Conference, 61-68 (2013).

Sharma, G., Color fundamentals for digital imaging, in Digital Color Imaging Handbook (G. Sharma Ed.), Chapter 1, CRC Press, 1-43 (2003).

R. Rossier, R.D. Hersch, 2010. "Introducing ink spreading within the cellular Yule-Nielsen modified Neugebauer model", in Proc. IS&T 18th Color Imaging Conference, 295-30.

Balasubramanian, R., Optimization of the spectral Neugebauer model for printer characterization, Journal of Electronic Imaging 8, 2, 156-166 (1999).

Bernardini, F.,Mittleman, J.,Rushmeier H,Silva, C., and Taubin, G.,The Ball-Pivoting Algorithm for Surface Re-construction,IEEE Trans.Vis. and Comp. Graph. 5, 4,349-359 (1999).

Morovic, J., Luo, M.R., The fundamentals of gamut mapping: a survey, Journal of Imaging Science and Technology 45, 3, 283-290 (2001).

Powell, M. J. D., The BOBYQA algorithm for bound constrained optimization without derivatives,, Cambridge NA Report NA2009/06, University of Cambridgte, UK (2009).

Morovic, J., Lammens, J., Color Management, in Colorimetry: Understanding the CIE system, (Ed. J. Schanda), Chapter 7, J. Wiley, 159-206 (2007).

* cited by examiner

|  | $\hat{c} \leq \hat{m} \leq \hat{y}$ | $\hat{c} \leq \hat{y} < \hat{m}$ | $\hat{m} < \hat{c} \leq \hat{y}$ | $\hat{m} \leq \hat{y} < \hat{c}$ | $\hat{y} < \hat{c} \leq \hat{m}$ | $\hat{y} < \hat{m} < \hat{c}$ |
|---|---|---|---|---|---|---|
| $a_w$ | $(1-\hat{y})$ | $(1-\hat{m})$ | $(1-\hat{y})$ | $(1-\hat{c})$ | $(1-\hat{m})$ | $(1-\hat{c})$ |
| $a_c$ | 0 | 0 | 0 | $(\hat{c}-\hat{y})$ | 0 | $(\hat{c}-\hat{m})$ |
| $a_m$ | 0 | $(\hat{m}-\hat{y})$ | 0 | 0 | $(\hat{m}-\hat{c})$ | 0 |
| $a_y$ | $(\hat{y}-\hat{m})$ | 0 | $(\hat{y}-\hat{c})$ | 0 | 0 | 0 |
| $a_r$ | $(\hat{m}-\hat{c})$ | $(\hat{y}-\hat{c})$ | 0 | 0 | 0 | 0 |
| $a_g$ | 0 | 0 | $(\hat{c}-\hat{m})$ | $(\hat{y}-\hat{m})$ | 0 | 0 |
| $a_b$ | 0 | 0 | 0 | 0 | $(\hat{c}-\hat{y})$ | $(\hat{m}-\hat{y})$ |
| $a_k$ | $\hat{c}$ | $\hat{c}$ | $\hat{m}$ | $\hat{m}$ | $\hat{y}$ | $\hat{y}$ |

FIG. 10

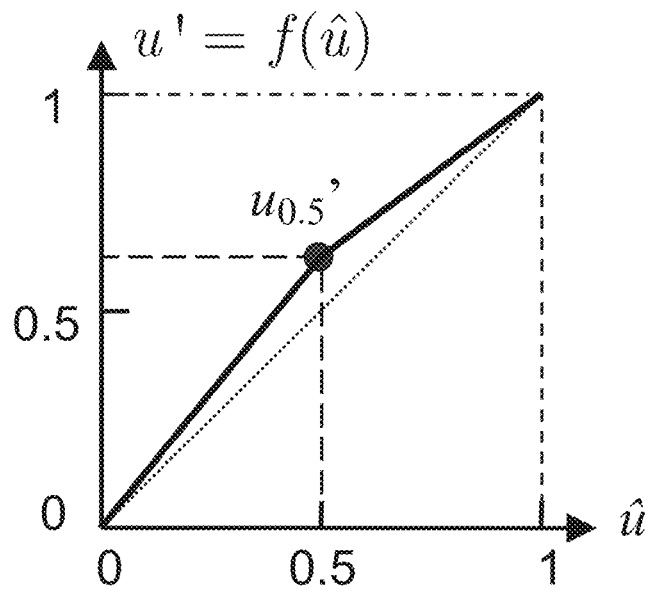

FIG. 11

| Test sets: 125 patches ($c, m, y$) by steps of 25% | $\Delta E_{94}$ | | |
|---|---|---|---|
| | Mean | 95% | Max |
| Parallel line halftones | 1.29 | 3.17 | 5.24 |
| Transverse line halftones | 1.88 | 5.61 | 8.39 |

FIG. 15

| Test set: 729 patches | $\Delta E_{94}$ | | |
|---|---|---|---|
| | Mean | 95% | Max |
| | 3.46 | 7.9 | 13.68 |

FIG. 16

FIG. 27A  QR1 & QR2
FIG. 27B  QR1
FIG. 27C  QR2

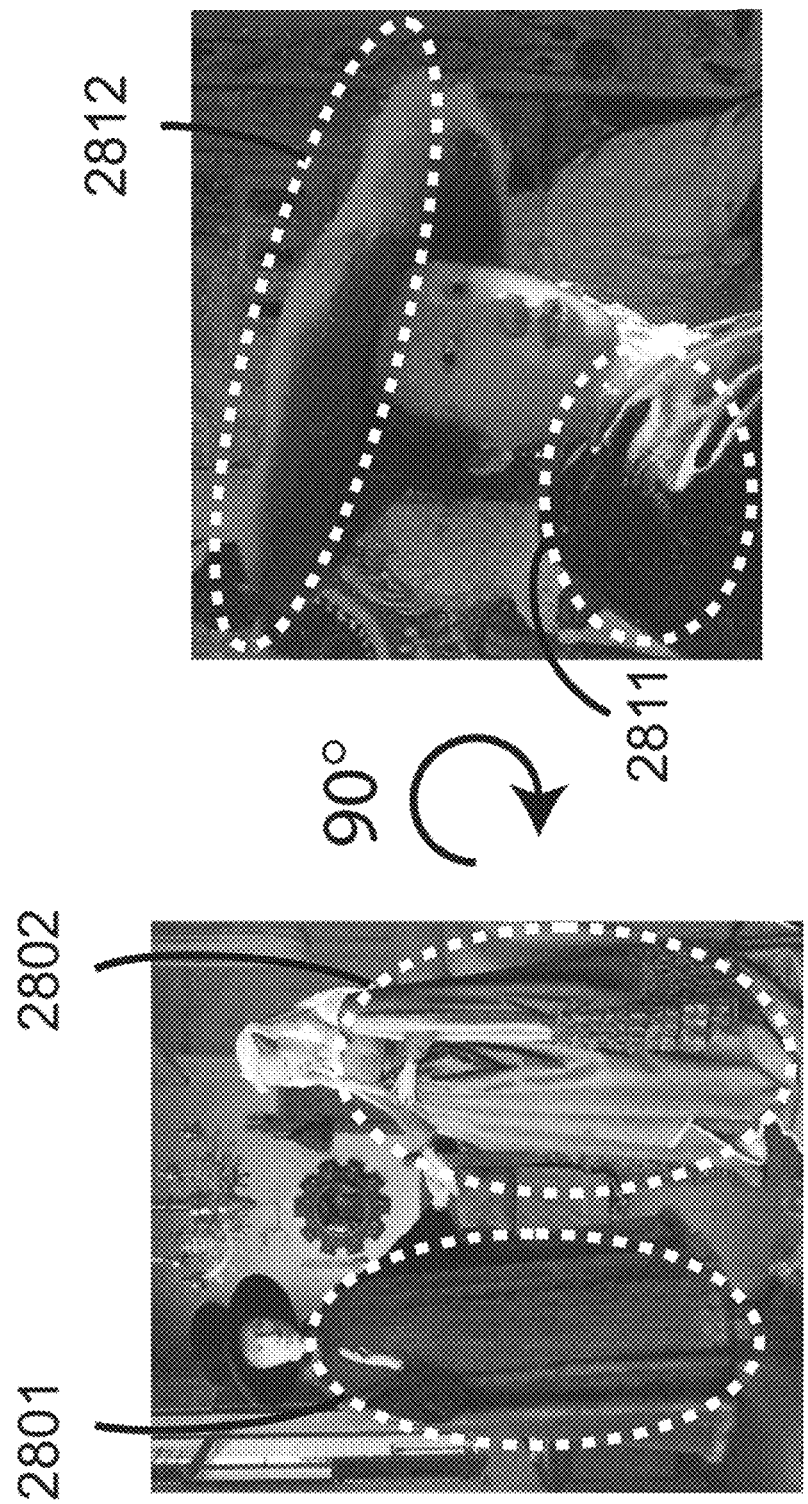

COLOR CHANGING EFFECTS WITH CROSS-HALFTONE PRINTS ON METAL

The present patent application is related to U.S. patent application Ser. No. 14/747,184, Color reproduction, pattern hiding and image alternations with halftone prints on metal, filed 23 Jun. 2015, by inventors P. Pjanic and R. D. Hersch, also inventors in the present patent application.

The content of the present invention is to be presented as a technical paper at the SIGGRAPH Asia 2015 conference that takes place between 2 Nov. and 5 Nov. 2015 in Kobe Japan. The corresponding printed paper is available 2 weeks before the start of the conference, from the ACM Digital Library.

BACKGROUND OF THE INVENTION

We propose color reproduction methods and computing systems for creating specularly reflecting color images printed on a metallic or metallized substrate that change their color upon in-plane rotation by 90°. Color changing metallic prints rely on the anisotropic dot gain of line halftones when viewed under specular reflection. The proposed color reproduction methods rely on a spectral prediction model specially conceived for predicting the color of non-rotated and of 90° in-plane rotated cross-halftones formed of superpositions of horizontal and vertical cyan, magenta and yellow line halftones. Desired non-rotated and rotated image colors are mapped onto the sub-gamut allowing for the desired color shift and then, using a 6D correspondence table, converted to optimal cross-halftone ink surface coverages. The proposed color color changing and decolorization techniques are especially effective for creating surprising effects such as image parts whose hues change, or gray regions that become colorful. These methods can be adapted to commercial printers capable of printing with cyan, magenta and yellow inks on substrates formed by an ink attracting plastic layer located on top of a metallic film layer. The resulting printed color varying images enable preventing counterfeits of security documents and valuable articles and at the same time create surprising effects that can be used to increase their attractiveness and aesthetics. Therefore, the invented color imaging methods are also useful for decoration, advertisement, art and amusement parks.

In respect to the prior art, U.S. Pat. No. 7,491,424 B2, Reproduction of security documents and color images with metallic inks, filed 19 May 2003, to inventors R. D. Hersch, F. Collaud, and P. Emmel, teaches a security feature obtained by combining a metallic ink and standard inks printed on paper to create color images with embedded hidden patterns under non-specular reflection. The patterns are revealed under specular reflection.

Pjanic and Hersch (also inventors in the present invention) created a color reproduction workflow for printing with classical inks on a metallic substrate, see P. Pjanic and R. D. Hersch, Specular color imaging on a metallic substrate, in Proc. IS&T 21st Color Imaging Conference, 61-68 (2013). In order to establish the correspondence between amounts of inks and resulting color under specular reflection, they used an ink spreading enhanced cellular Yule-Nielsen spectral prediction model. The goal of that method is to simply reproduce an original color image. It does not support the creation of desired color variations by rotating the print under specular reflection.

In U.S. patent application Ser. No. 14/747,184, Color reproduction, pattern hiding and image alternations with halftone prints on metal, filed 23 Jun. 2015, inventors P. Pjanic and R. D. Hersch, also inventors in the present patent application, teach methods for creating color or achromatic images that are printed with classical cyan, magenta, yellow inks and a white diffusing ink on a metallic substrate. These methods allow to view on the same metallic print one grayscale image in specular viewing mode and a second independent grayscale image in non-specular viewing mode. They also allow to hide a pattern such as text, graphics or a grayscale image within the printed color image in one viewing mode, specular or non-specular and show that pattern in the second viewing mode, non-specular or specular, respectively. In contrast to the present invention, the halftone layers are made of round ink dots and the in-plane rotation of the print under specular reflection does not induce desired color variations. That patent application appeared also as technical paper at the SIGGRAPH conference 2015, Los Angeles, that started on 9 Aug. 2015. The paper reference is the following: P. Pjanic, R. D. Hersch, Color Imaging and Pattern Hiding on a Metallic Substrate, Proc. SIGGRAPH, ACM Trans. On Graphics 34 (3), article 130, (2015). This paper was made available to the public 2 weeks before the start of the conference, from the ACM Digital Library.

SUMMARY OF THE INVENTION

We propose methods and a computing system running software for creating metallic prints showing under specular reflection color changes such as hue changes, decolorizations from chromatic to achromatic colors and recolorizations from achromatic to chromatic colors as well as independent color changes when rotating the metallic print in-plane by a quarter turn, i.e. by approximately 90°. This framework is based on the anisotropic dot gain that occurs under specular reflection, when line halftones printed on a metallic or metallized layer are rotated in-plane by 90°. The observation of this anisotropic dot gain brought us to the idea of creating cross-halftone color screens that show a first color before rotation and a second color after rotation. The cross-halftone screens are formed by two sets of intersecting ink halftone lines, with one set of halftone lines in transverse orientation and the second set in parallel orientation in respect to the plane of incidence.

Best effects are obtained for hue changes as well as for the decolorization or recolorization of color images. But one may also have a first image in non-rotated mode and a totally independent second image in rotated mode, but within limited chroma and lightness ranges (FIG. 21, 2102)

The reproduction framework enables specifying a first initial color or grayscale image and a second modified or independent color or grayscale image with appropriate changes in hues, chroma and lightnesses. The framework then deduces for each pair of colors from a same location of the first and second image the surface coverages of the inks to be printed as cross-halftones at that location. In the case of cyan, magenta, yellow inks, there are 6 surface coverages, three surface coverages for the transverse line halftone and three surface coverages for the parallel line halftone of the cross-halftone.

In the preparation phase, a model is calibrated that predicts the colors in non-rotated and rotated modes according to the ink surface coverages of the cross-halftone. With this color prediction model, a "multi-dimensional cross-halftone surface coverage to color table" is established that gives the correspondence between the ink surface coverages and the resulting colors viewable in non-rotated and rotated viewing modes. To facilitate the creation of the different sub-gamuts and to speed up the computation of the ink surface coverages during the printing phase, we create a "multi-dimensional desired color table" mapping a first desired color in non-rotated viewing mode and a second desired color in rotated viewing mode to the ink surface coverages of the cross-halftone by minimizing with the color prediction model a difference metric between desired and achieved colors in non-rotated viewing mode and desired and achieved color in rotated viewing mode. The preferred difference metric is the sum of $\Delta E_{94}$ color differences. Then depending on the desired color change between the first and the second image, we create a sub-gamut allowing for the desired color change. In order to speedup gamut mapping of input image colors to colors mapped into this sub-gamut, we build for each considered sub-gamut a sub-gamut mapping table whose entries correspond to the sampled color values of the space of input colors (e.g. sRGB). Each entry into this sub-gamut table delivers the corresponding gamut mapped color located within this sub-gamut.

In the printing phase, the colors of the first input image and the colors of the second input image are gamut mapped to the sub-gamut allowing for the desired color change, by accessing the sub-gamut mapping table. This yields the first gamut mapped image that will be viewable in non-rotated viewing mode as well as the second gamut mapped image that will be viewable in rotated viewing mode. The surface coverages of the inks for the parallel and transverse halftone lines are obtained by accessing for each pair of colors from the first gamut mapped image and from the second gamut mapped image the multi-dimensional desired color table. With the obtained surface coverages of the inks, the parallel and the transverse line halftone screen elements are formed and merged ink layer by ink layer by an "OR" operation to form the cross-halftoned ink separations. These cross-halftoned ink separations are sent to the printer which prints them on a metallic substrate.

In the case of prints with cyan, magenta and yellow inks, the multi-dimensional cross-halftone surface coverage to color table is a 6D table yielding two colors per entry, one in non-rotated and one in rotated viewing mode. The multi-dimensional desired color table is also a 6D table having as entries two colors, one in non-rotated and one in rotated viewing mode and yielding 6 surface coverages, 3 surface coverages for the parallel halftone lines and 3 surface coverages for the transverse halftone lines.

The creation of the sub-gamuts in the preparation phase depends on the desired color changes. In case that the second input color image differs mainly from the first input color image due to hue variations, the computed sub-gamut is a hue variation sub-gamut. In case that the second input color image is a grayscale image, the computed sub-gamut is a decolorization sub-gamut. In case that the second input color image is independent of the first color image, the computed sub-gamut is an independent color variation sub-gamut. In case that different kinds of color changes are desired for different pairs of images, all the mentioned sub-gamuts may be computed during the preparation phase and be usable during the printing phase.

The proposed hue shift, decolorization, recolorization and independent color changing computing system and software is especially effective for creating surprising effects, for example in art, advertisement and for exhibitions. Designers may use the hue shift effect to convey an artistic message or to bring the attention of the observers toward the parts of a design that change their colors.

Hue variations, decolorization, recolorization and independent color changes may also find applications in document security. Potential counterfeiters cannot copy or "fake" the proposed hue, chroma and lightness changing effects. Valuable items such as passports, identity cards, credit cards, personal entry cards, medical cards, diploma, driving licenses, hunting licenses, original business documents, classified documents, shipping documents, event tickets, transportation tickets, product labels, home care goods, beauty products, health care products, food and beverage products, pharmaceuticals and drugs, electronic equipment, valuable metallic components, aerospace components, automotive components, sporting products, fashion products, jewellery, watches, compact disks and DVD's can be protected against counterfeits.

The proposed software framework can be easily installed into a production environment, since it only requires commercially available equipment for printing with classic cyan, magenta and yellow colors on a substrate formed by an ink attracting plastic layer located on top of a metallic film. The substrate may also be formed by a metallized plastic film. Instead of printing on top of a metallic or metallized substrate, the cross-halftone prints can also be printed on transparencies that are then brought on top of a metallic substrate or of a metallic film, for example by pasting, by lamination, by polymerization or by a shrink sleeve process. The metallic film may also be deposited on the other side of a cross-halftone printed plastic sheet by a metallic particle deposition process such as vaporization, spraying, electroless plating or electroplating.

Such a procedure facilitates the deposition of metallic color changing cross-halftone prints on top of curved surfaces, such as pieces of metals, metallic parts, bottles with a metallic film.

BRIEF DESCRIPTION OF THE DRAWINGS

FIG. 10 shows a table with the line-on-line equations describing colorant area coverages $a_w$, $a_c$, $a_m$, $a_y$, $a_r$, $a_g$, $a_b$, $a_k$ as a function of ink surface coverages $\hat{c}$, $\hat{m}$, $\hat{y}$, where indices w, c, m, y, r, g, b, k stand for white, cyan, magenta, yellow, red, green, blue, and black, respectively;

FIG. 11 shows an ink spreading curve mapping normalized nominal ink surface coverages to normalized effective ink surface coverages;

FIG. 15 shows a table giving the prediction accuracy of the line-on-line cyan, magenta and yellow IS-CYNSN model for specular reflectances (25°:25°), expressed as average, 95% quantile and maximal $\Delta E_{94}$ color differences between halftone patch predictions and halftone patch measurements, for test sets of 125 halftones representing all combinations of 0, 25%, 50%, 75% and 100% C, m, y ink surface coverages;

FIG. 16 shows the prediction accuracy for the 6 ink spectral model predicting the reflectance of cross-halftones, expressed as average, 95% quantile and maximal $\Delta E_{94}$ color difference, with test samples forming all c, m, y, ink combinations with values of 0%, 40% and 80% for the parallel and transverse components of the cross-halftone;

FIG. 27A show the overlay of two QR-code messages within one color changing image, where one message (shown in gray) appears in non-rotated mode as shown in FIG. 27B and the other message (shown in black) appears in rotated mode as shown in FIG. 27C;

FIGS. 28A and 28B show two independent color pictures covering the same area, where under specular reflection one picture with low chroma brown 2801 and green 2802 colors appears in non-rotated mode, as shown in FIG. 28A, and the other picture with low chroma blue 2811 and red 2812 colors appears in rotated mode as shown in FIG. 28B;

DETAILED DESCRIPTION OF THE INVENTION

Figure 2:
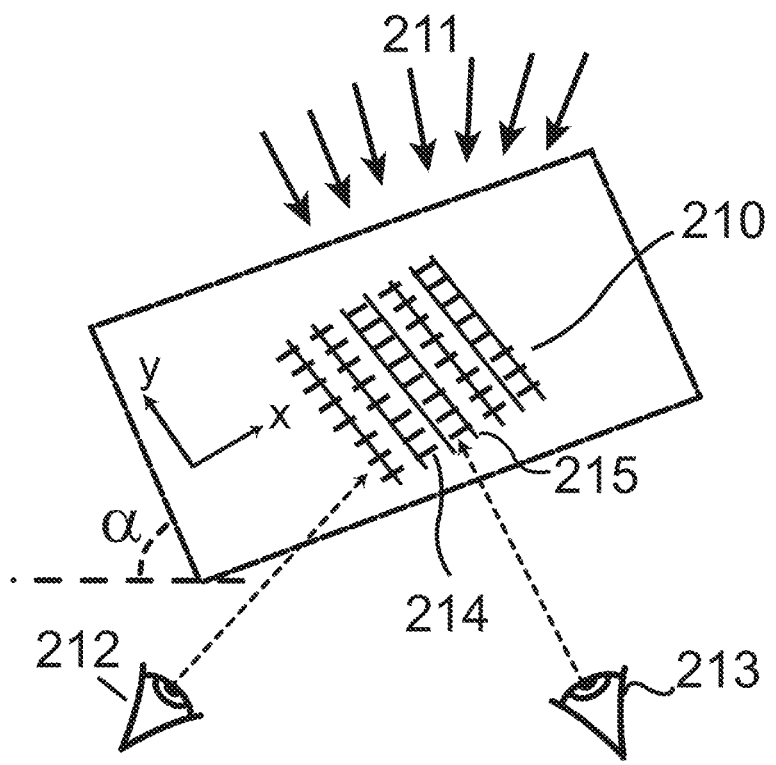
FIG. 2 shows an example of a setup to observe under specular viewing conditions a metallic print 210 when walking from a first position 212 to a second position 213, seeing at the first position mainly light reflected by a first array of lines 215 in transverse mode and at the second position mainly light reflected by the second array of lines 214 in transverse mode.

We observed that the color of non-isotropic halftones such as line halftones printed on a metallic substrate strongly depends on the orientation of the print. Line halftones on metal induce an anisotropic dot gain effect. There is a strong dot gain when the halftone line screen is perpendicular to the incident light and a low dot gain when the halftone line screen has the same orientation as the incident light. These observations led us to the idea of creating color halftones made of two superposed structures, one structure being formed by lines having a transverse orientation in respect to the incident light and a second structure formed by lines having a parallel orientation in respect to the incident light. These two structures are superposed and form a cross-halftone (FIG. 2). Each line structure comprises freely chosen surface coverages of the superposed cyan, magenta and yellow inks. Due to the large dot gain of colored lines in transverse orientation, rotating the metallic print by approximately 90° in its own plane (azimuthal rotation) modifies the hues and chroma of the cross-halftones and to some extent also their lightnesses.

We build upon the hue and chroma changing capabilities of metallic cross-halftone prints viewed under specular reflection to create color images that keep their overall shape, but change their colors when being rotated azimuthally by approximately 90°. The idea is to let a designer take one color image and to allow him to recolor this color image with new hues or with modified chroma values, using a tool such as Adobe Photoshop. This modified image represents then the second image. The user may also specify two independent images. For each pair of initial and modified colors, the proposed method finds the solution that is the closest to the desire of the user, i.e. the surface coverages of the cross-halftone inks that yield a color as close as possible to the initial color for the non-rotated print and a color as close as possible to the modified color for the rotated print.

The computation framework for obtaining the surface coverages of the inks yielding the desired pair of initial and modified colors relies on a spectral prediction model. This spectral prediction model has 6 input parameters, namely the cyan (c), magenta (m) and yellow (y) surface coverages of inks for the horizontal and for the vertical line halftone structures. This spectral prediction model predicts the color of the print at its initial orientation as well as the color of the print after 90° in-plane rotation. By minimizing a cost function relying on the prediction model for computing the difference between a desired pair of colors and the corresponding achievable pair of colors, we obtain the surface coverages of the three inks ($c_T$, $m_T$, and $y_T$) for a line halftone in transverse orientation and the surface coverages of the three inks ($c_P$, $m_P$, and $y_P$) for a line halftone in parallel orientation.

We consider in the present work two viewing conditions, a first specular viewing condition where the print is at its initial position and a second specular viewing condition where the print is azimuthally rotated by approximately 90°. For these two specific viewing conditions, we propose a new model making accurate color predictions as a function of the 6 surface coverages of the inks.

Vocabulary

Classical inks are substantially transparent chromatic or achromatic inks that are in general use for printing on paper, i.e. primarily the cyan, magenta and yellow inks as well as further colored inks, such as light cyan, light magenta, red, green, blue, orange, pink, violet, or achromatic inks such as gray and black inks. Transparent inks are inks that absorb part of the light in some wavelength range and transmit the remaining light to the next layer. The metallic layer is a flat layer that reflects the incident light primarily in the specular direction.

"Specular viewing conditions", "specular observation conditions" or equivalently "specular viewing mode" indicate that the print is viewed by having mainly light specularly reflected by the metallic print reaching the eyes of the observer.

Figure 1:
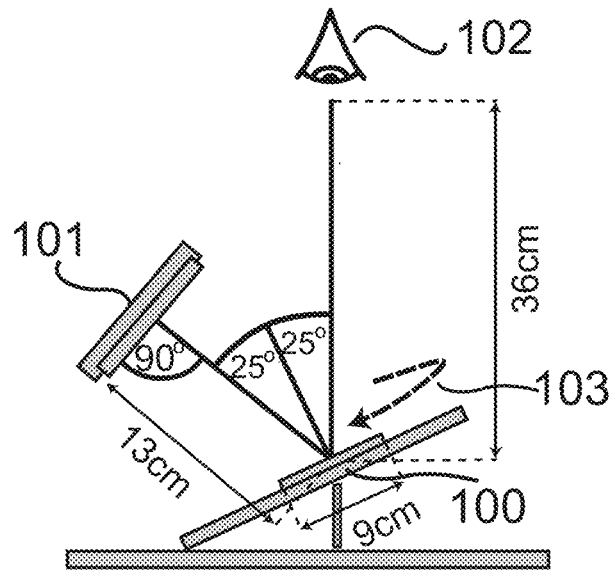
FIG. 1 shows an example of a setup to observe a print under specular viewing conditions, with a light table 101, the print 100, the observer 102 and the in-plane rotation of the print 103.

The "incident plane", "incident light plane" or "plane of incidence" is the plane formed by the incident light rays originating from a light source (FIG. 1, 101) that are specularly reflected by the print (FIG. 1, 100) in the direction of the eyes (FIG. 1, 102). The incident plane can also be defined as the plane containing the view vector and the normal to the print.

In non-rotated viewing mode, the print appears as originally printed, with the horizontal halftone lines, called "transverse lines", perpendicular to the incident plane and the original vertical halftone lines, called "parallel lines", lying parallel to the incident plane. In a preferred cross-halftone screen, the set of parallel and the set of transverse halftone lines intersect each other and are orthogonal one to another.

In rotated viewing mode, either the print is rotated in-plane by approximately 90° (FIG. 1, 103), or the observer changes its position (e.g. FIG. 2, from 212 to 213), or possibly the light source and the observer are on the same platform and rotate around the normal of the print. In non-rotated viewing mode, a first image appears to the observer. In rotated viewing mode, the second image appears at the same position as the first image and the first image is not visible any more.

A "non-rotated" is a color that appears in non-rotated viewing mode. A "rotated" color is a color that appears in rotated viewing mode, i.e. after quarter turn in-plane rotation of the metallic cross-halftone print.

The term "an image that changes its color" is equivalent to "two images that are embedded within the same area" or "two images that cover the same area". The first image is the non-rotated image that appears before the change of colors and the second image is the rotated image after the change of colors. The term "color changing effect" has the same meaning as "color varying effect".

The term "90° in plane rotation", "quarter turn" or "azimuthal 90° rotation" are used interchangeably. The terms "non-rotated mode" and rotated mode" are identical to "non-rotated viewing mode" and "rotated viewing mode".

"Color change" is used as general term that can mean a hue shift, a chroma change, e.g. from a chromatic color to an achromatic (gray) color, or a general change in hue, chroma and lightness.

The expression "printing on top of a metallic substrate" or does not necessarily mean that the inks are directly printed on the metallic substrate. The metallic substrate may be covered with a transparent layer on which the inks are printed. The metallic substrate may also be a metallized film. Such a metallized film is a plastic layer that is metallized by a deposition process (e.g. vapor deposition) that brings metallic particles onto the surface of the plastic layer.

In the present invention, the term "color" comprises also the achromatic colors (gray values or gray levels), i.e. a color image may also be a grayscale image.

Viewing and Illumination Conditions

One may view the print incorporating the color changing effects under specular reflection in front of a window. By remaining under specular reflection and rotating the print in-plane by 90 degrees (azimuthal rotation), one observes the color changes. Instead of looking at the print in front of a window, one may create a setup where a flat uniformly illuminating light table (FIG. 1, 101) is placed in a dark room. The light table may be placed at an oblique orientation and the print 100 placed so as to view it under specular viewing conditions (FIG. 1A). By rotating 103 the print 100 in plane and keeping it in specular viewing condition, one may observe the color changing effect.

One may also create a large setup (FIG. 2), where the print 210 is illuminated 211 from one side, for example by a large window. Then, when walking along that print at a certain distance from it, the observer may see from position 212 the print first in transverse mode in respect to line halftone 215 and in parallel mode in respect to line halftone 214 and then by walking to the next position 213 in parallel mode in respect to line halftone 215 and in transverse mode in respect to line halftone 214. Such a setup may be used for showing posters, for publicity or for entertainment.

Experimental Setup

Figure 3:
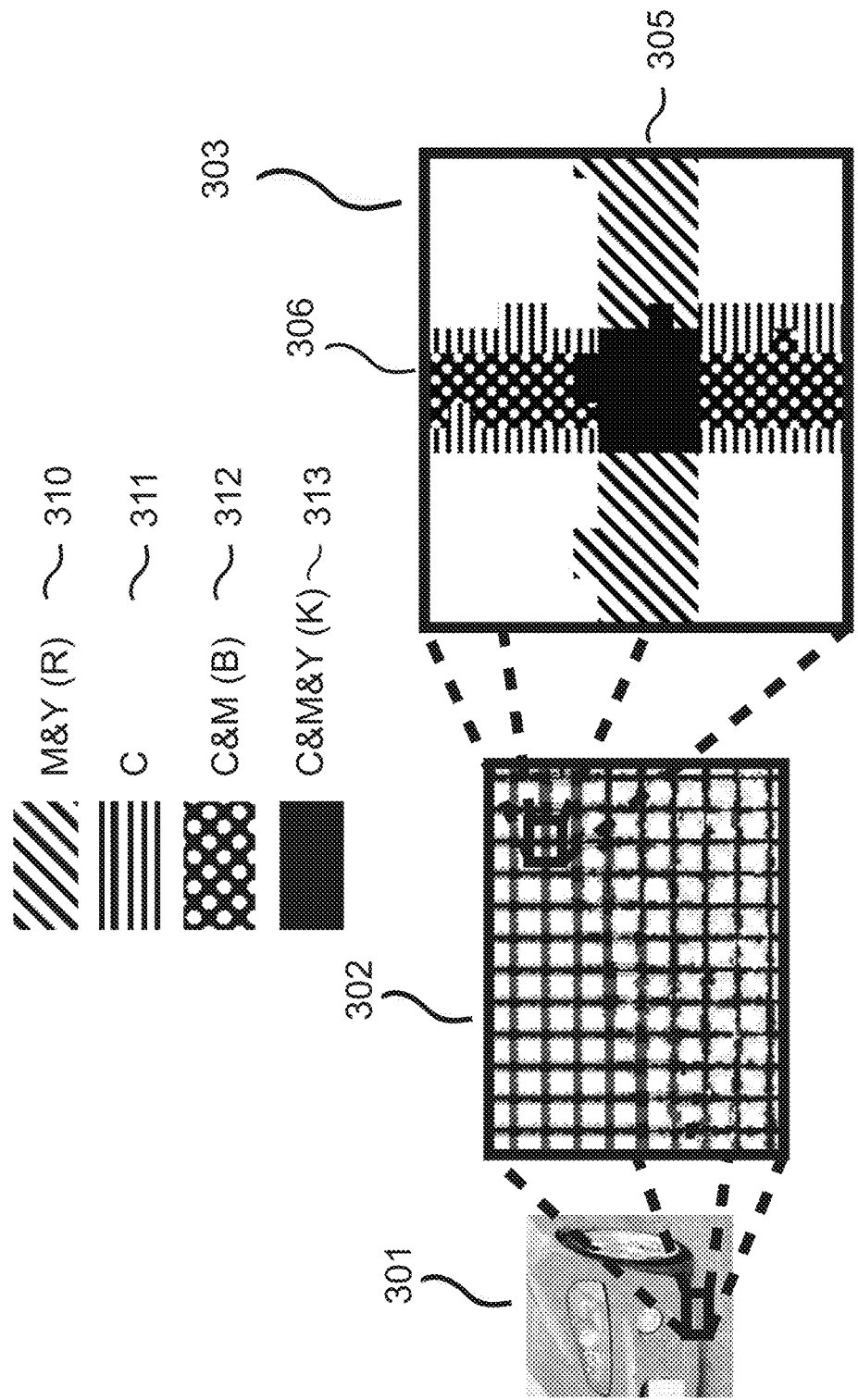
FIG. 3 shows as example a cross-halftone 301, enlarged 302 and 303, made of intersecting horizontal (305, transverse) and vertical (306, parallel) line halftone structures with the ink layers printed "line-on-line", resulting in colorants red (R) 310, cyan (C) 311, blue (B) 312, and black (K) 313.

Let us give an example explaining how color shifting cross-halftones are printed and measured. We use the Epson StylusPro WT7900 commercially available printer for printing cyan, magenta and yellow ink halftones on a metallized film at a resolution of 1440 dpi. The ink halftone screen that we generate consists of horizontal and vertical lines. Horizontal and vertical lines are formed of variable surface coverages of the cyan, magenta and yellow ink halftones superposed line-on-line (FIG. 3).

Both horizontal and vertical line halftones are printed at e.g. at 100 lpi or 150 lpi. To create the cross-halftone ink layer, we create separately the horizontal and vertical line halftone layers for the cyan, magenta and yellow inks. Then, we merge the horizontal and vertical line halftone layers of the same ink to create the cross-halftoned ink layer by printing a pixel of a given ink if it belongs to either the corresponding horizontal or vertical line halftone ink layer. We create the cross-halftone ink layers for the cyan, magenta and yellow inks and send them to the printer.

The reflectances of the printed halftones are measured with a custom-built spectrophotometer. This spectrophotometer is designed to mimic the viewing conditions when the sample is viewed under specular reflection from a window. The sample is therefore illuminated with a panel light source. The samples are measured at specular illumination and reflection angles centered around the angle 25° in respect to the normal. The light source is a 150 W Halogen Dolan-Jenner DC-950H DC-Regulated Fiber Optic Illuminator connected through a fiber optic light guide to a 4.25"×3.37" illuminator from Edmund Optics providing a highly diffuse and even light distribution. An optical fiber having a 600 μm diameter and a 12.5° half-angle cone aperture mounted on a graded rotational stage collects the light reflected from the sample at 25°. The optical fiber is connected to a Maya 2000 Pro back-thinned CCD spectrophotometer from Ocean Optics. Reflectances are calculated by dividing the captured irradiance of the considered print by the captured irradiance of the unprinted metallic surface.

CIELAB colors are deduced from the obtained reflectances by first converting the reflectances to the CIE-XYZ space under the D65 illuminant and for the CIE 1931 Standard Observer, with the unprinted silver substrate set as Y=100. Then the CIE-XYZ coordinates are converted to the CIELAB space by selecting the brightest patch under specular viewing conditions, i.e. the unprinted metallic surface, to be the white reference point. Color differences are expressed with the $\Delta E_{94}$ metric. Color differences below 1 are not perceptible and between 1 and 2 are barely perceptible by the human eye, see Sharma, G. Color fundamentals for digital imaging, in Digital Color Imaging Handbook (G. Sharma Ed.), Chapter 1, CRC Press, 1-43 (2003), incorporated by reference and hereinafter referenced as [Sharma 2003].

Directional Optical Dot Gain

In halftone prints, the dot gain expresses the difference between the effective surface coverage of an ink and the nominal surface coverage that the printer is asked to print. In halftone prints on paper, the effective surface coverage is determined by the actual area of the printed dot and also by the lateral propagation of light within the substrate due to subsurface scattering, see the article by R. Balasubramanian, Optimization of the spectral Neugebauer model for printer characterization, Journal of Electronic Imaging 8, 2, 156-166 (1999), incorporated by reference and hereinafter referenced as [Balasubramanian 1999].

Figure 4A:
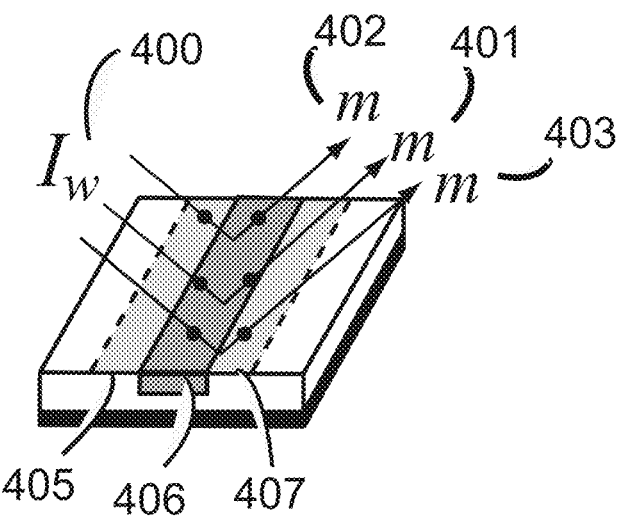
FIG. 4A shows a segment of a line halftone located perpendicularly to the incident light $I_w$ (400), i.e. in transverse mode.
Figure 4B:
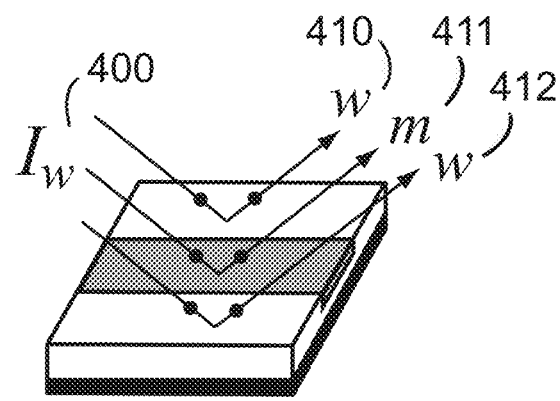
FIG. 4B shows a segment of a line halftone located parallel to the incident light $I_w$ (400), i.e. in parallel mode.

Halftones printed on a highly specular substrate such as metallized film show under specular reflection directional optical dot gain. The dot gain effect depends on the anisotropy of the halftone shape in respect to the plane formed by the illumination and viewing orientations (incident plane). The impact of the azimuthal orientation of the print on the directional dot gain is maximized by superposing parallel and transverse halftone lines. Transverse halftone lines are perpendicular to the incoming light rays. They contribute more to the overall color, since they have a large directional dot gain (FIG. 4A). Halftone lines parallel to the incoming rays have a negligible directional dot gain (FIG. 4B). Example FIG. 4A shows schematically that the reflected light in transverse mode is of color magenta (m) 402, magenta (m) 401 and magenta (m) 403, i.e. the light traversing areas 405 and 407 close to the inked area as well as the inked area 406 becomes colored according to the color of the inked area. In contrast, FIG. 4B shows schematically that the light reflected in parallel mode is composed of white (w) 410, magenta (m) 411 and white (w) 412, i.e. the reflected light traversing areas close to the inked area remains uncolored.

Figure 4C:
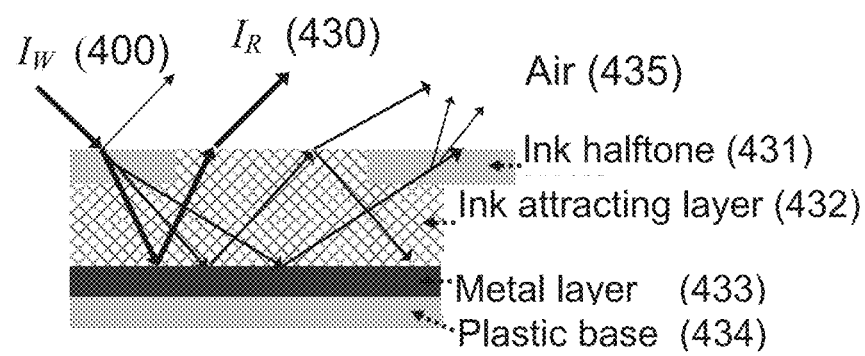
FIG. 4C represents a cross-section of the print which shows that in transverse mode, light attenuated by the transparent ink line halftone exits also from non-inked regions (430)

The print is composed of the ink halftone layer, the metallized substrate formed by a transparent ink attracting polymer, the metallic substrate (film) and the background support (FIG. 4C). The ink halftone slightly diffuses the incoming light. Due to the reflection of light on the metallic substrate and to Fresnel reflections at the polymer-air interface, multiple reflections of light occur. At each of these reflections, part of the light exits the print and part of it is internally reflected. In transverse mode, due to the height of the ink attracting polymer, light attenuated by the ink halftone may exit the print at non-inked locations. This results in the important directional optical dot gain that appears when the halftone lines are laid out in transverse mode, i.e. perpendicularly to the incident light.

Figure 5:
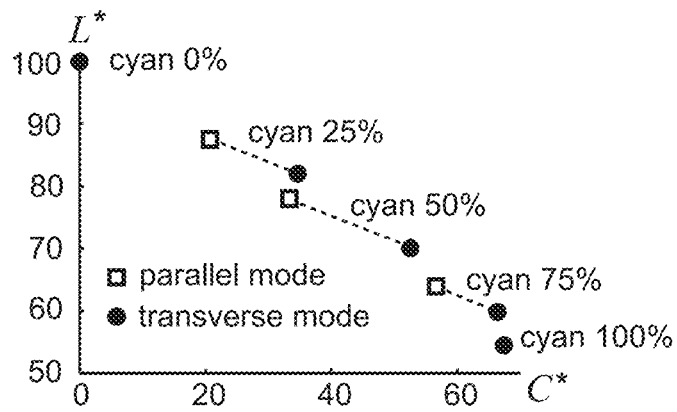
FIG. 5 shows lightness L* and chroma C* of the cyan line halftones with nominal surface coverages of 0%, 25%, 50%, 75% and 100% measured in parallel and transverse modes (i.e. parallel to the incident light and perpendicular to the incident light) where the differences in lightness and chroma between the parallel and transverse modes demonstrate the impact of the large dot gain in transverse mode.

FIG. 5 shows the effect of the directional optical dot gain on the color measured with our custom spectrophotometer. We measured under specular reflection (geometry: 25°:25°) cyan halftones lines printed on a metallized film laid out both in parallel mode and in transverse mode with nominal surface coverages of 0%, 25%, 50%, 75% and 100%. The directional optical dot gain has a strong impact on the lightness and chroma of the samples (FIG. 5). In transverse mode, the directional dot gain is maximized and yields darker and higher chroma samples compared to the same samples measured in parallel mode, where the directional dot gain is minimal. At 0% and 100% surface coverage, the orientation is irrelevant.

Figure 6:
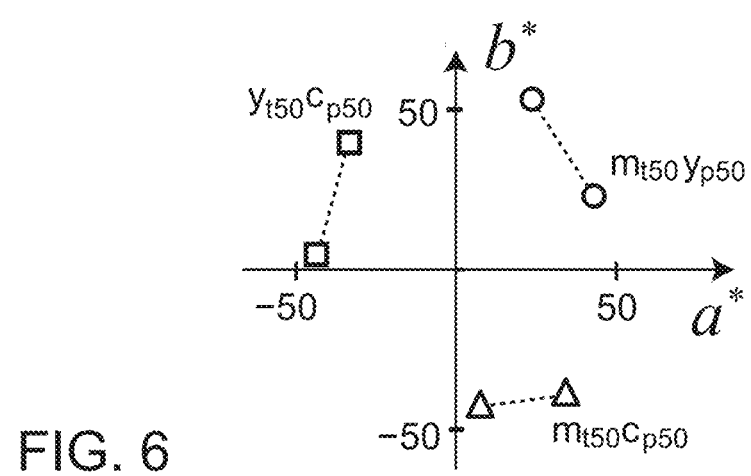
FIG. 6 shows the color behavior upon rotation of a cross-halftone formed by two inks, one with lines laid out in transverse mode and the second with lines in parallel mode, where for example, "$y_{t50}c_{p50}$" means a halftone with 50% surface coverage of yellow in transverse mode and 50% surface coverage of cyan in parallel mode and where the other end of the dashed line is the color after 90° turn in-plane rotation.
Figure 7:
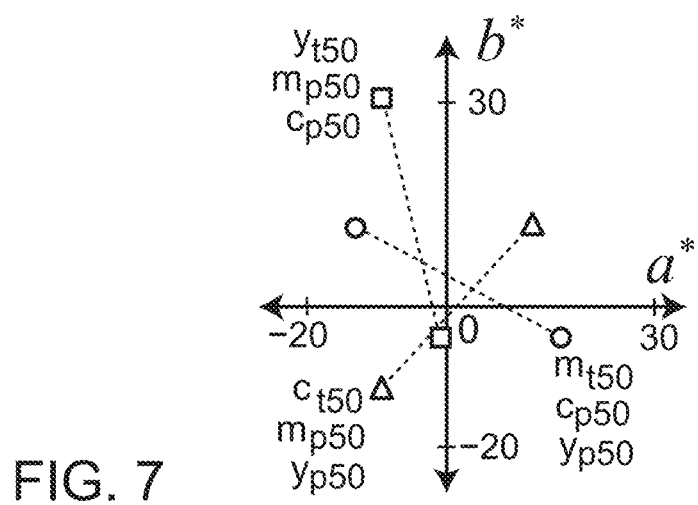
FIG. 7 shows the color behavior of 50% surface coverage halftones formed by 3 inks yielding a very large hue shift, where the marker close to the label shows the color of the print before rotation and the other end of the dotted line shows the color after rotation.

In order to have a better view of the color shifts that can be achieved with two or three inks, let us examine several special cases of interest. FIGS. 6 and 7 show the colors of cross-halftones where the different inks have the same surface coverages. In FIG. 6, a first ink line halftone is laid out in transverse mode (index t) and the second ink line halftone is laid out in parallel mode (index p). In FIG. 7, the second and third ink are superposed on the line halftone in parallel mode. After 90° in-plane rotation of the print, the ink line halftone laid out in transverse mode is in parallel mode and the ink(s) line halftone laid out in parallel mode are in transverse mode. The corresponding color shifts are shown by the dotted lines. The color of the ink lines in transverse mode dominates.

The Ink Spreading Enhanced Cellular Yule-Nielsen Modified Spectral Neugebauer (IS-CYNSN) Model for Line-on-Line Halftones The 6D color prediction model established for predicting the color of cross-halftone relies partly on the cellular Yule-Nielsen modified spectral Neugebauer (IS-CYNSN) model for line-on-line halftones.

The IS-CYNSN reflectance prediction model relies on the same principles as the Yule-Nielsen modified Spectral Neugebauer model (YNSN), see [Balasubramanian 1999]. In the YNSN model, the predicted spectral reflectance of a halftone is $$R(\lambda) = \left(\sum_i a_i R_i(\lambda)^{1/n}\right)^n \quad (1)$$

where $R_i(\lambda)$ is the measured spectral reflectance of the $i^{th}$ fulltone colorant (also called Neugebauer primary), $a_i$ is its effective area coverage, and n is an empirical scalar coefficient related to the halftone screen frequency and halftone dot profile. In the YNSN model, colorants are formed by all possible superpositions of fulltone inks and paper white. In case of the three inks cyan (c), magenta (m) and yellow (y), there are $2^3=8$ fulltone colorants: white (no inks), cyan, magenta, yellow, blue (cyan & magenta), red (yellow & magenta), green (cyan & yellow) and black (cyan & magenta & yellow). The "&" sign indicates a superposition of the fulltone inks.

Figure 8:
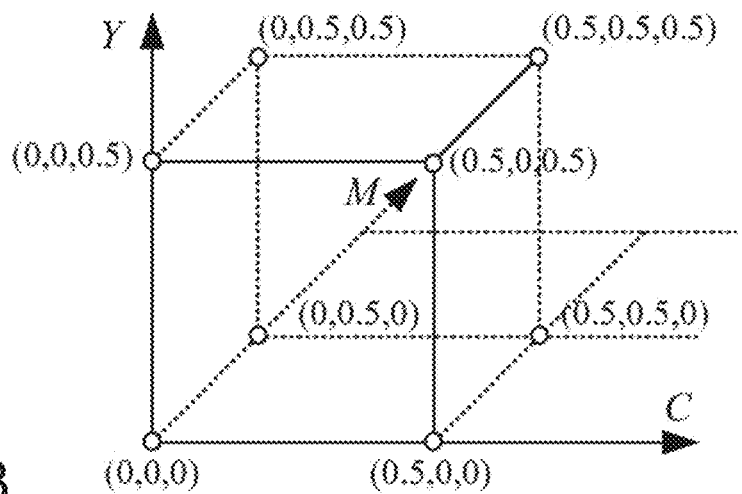
FIG. 8 shows one of the 8 sub-cubes obtained by the combinations of 0%, 50% and 100% surface coverages of the three cyan (C), magenta (M) and yellow (Y) inks.

In the IS-CYNSN model, the three-dimensional ink space (c, m, y) is subdivided into 8 sub-cubes whose vertices are given by colorants formed by combinations of c, m, y nominal surface coverages of 0, 0.5 and 1 (fulltone). For three inks, there are $3^3=27$ colorants (primaries). One of the sub-cubes is shown in FIG. 8.

Figure 9A:
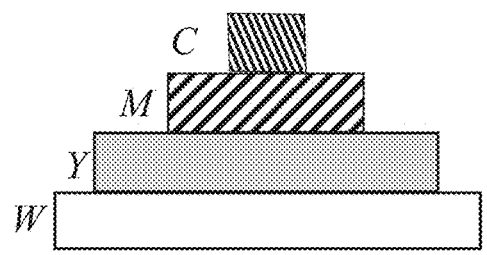
FIG. 9A represents a cross-section and FIG. 9B a top view of a line-on-line printed cyan, magenta, yellow line halftone, for surface coverages c≤m≤y, where the & sign indicates the superposition of inks, C, M, Y represent ink line surfaces of cyan, magenta and yellow, respectively, where W represents the unprinted metallic substrate and where R and K represent the red and black colorants, respectively, formed by superpositions of inks Y & M and Y & M & C, respectively.
Figure 9B:
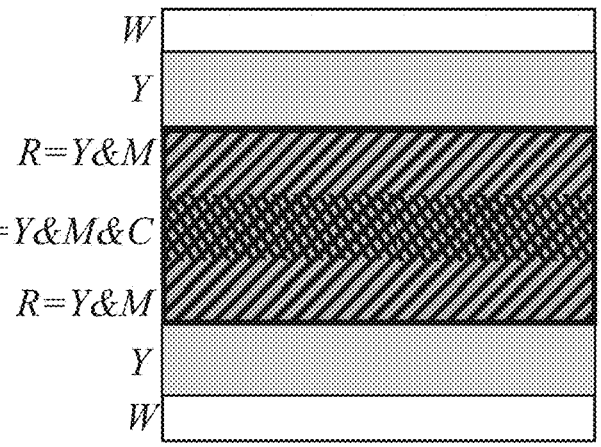

In line-on-line halftone screens, each ink line is printed in exact superposition with the other ink lines (FIGS. 9A and 9B). The colorants that are present within a given superposition of cyan, magenta and yellow lines depend on their respective surface coverages. For example, in FIG. 9, with an ink dot surface relationship c≤m≤y, the area coverages $a_k$, $a_r$, $a_y$, $a_w$ of the colorants black (superposition of cyan, magenta and yellow), red (superposition of yellow and magenta), yellow (yellow printed alone) and white, respectively, are the following:

$a_k$=c; surface coverage of the colorant black
$a_r$=m−c; surface coverage of the colorant red
$a_y$=y−m; surface coverage of the colorant yellow
$a_w$=1−y; surface coverage of the colorant white.

Within each sub-cube, the input ink surface coverages (c, m, y) are normalized (ĉ, m̂, ŷ):

$$\hat{c} = \frac{c - c_l}{c_h - c_l} \quad \hat{m} = \frac{m - m_l}{m_h - m_l} \quad \hat{y} = \frac{y - y_l}{y_h - y_l} \quad (2)$$

where $c_l$, $m_l$, and $y_l$ indicate the lowest surface coverages (0 or 0.5) within the considered sub-cube, and $c_h$, $m_h$ and $y_h$ indicate the highest surface coverages (0.5 or 1) within the considered sub-cube.

In order to predict the spectral reflectance for the line-on-line halftones, the normalized effective area coverages $a_i$ of the colorants in function of the normalized ink surface coverages are calculated according to the entries of the table shown in FIG. 10.

Due to the spreading of ink dots on the underlying substrate and inks, the normalized effective surface coverages c', m', y' differ from the normalized nominal surface coverages ĉ, m̂, ŷ, see publication by R. Rossier and R. D. Hersch, 2010. "Introducing ink spreading within the cellular Yule-Nielsen modified Neugebauer model", in Proc. IS&T 18th Color Imaging Conference, 295-300, herein incorporated by reference and referenced as [Rossier and Hersch 2010].

FIG. 11 shows an ink spreading curve mapping normalized nominal ink surface coverages to normalized effective surface coverages û→f(û). We recover ink spreading curves by printing the color sample located at the center of each sub-cube. Normalized effective dot sizes $c_{0.5}'$, $m_{0.5}'$, $y_{0.5}'$ at the center of each sub-cube are fitted by minimizing the square difference between the measured reflectance and the reflectance predicted according to Equation (1), by performing the conversion between normalized ink surface coverages and colorant area coverages according to the table of FIG. 10. Within each sub-cube, three ink spreading curves mapping nominal to effective surface coverages are formed by linearly interpolating between points (0,0) (0.5, $u_{0.5}'$) and (1,1), where the $u_{0.5}'$ is a place holder for $c_{0.5}'$, $m_{0.5}'$, $y_{0.5}'$.

Figure 12:
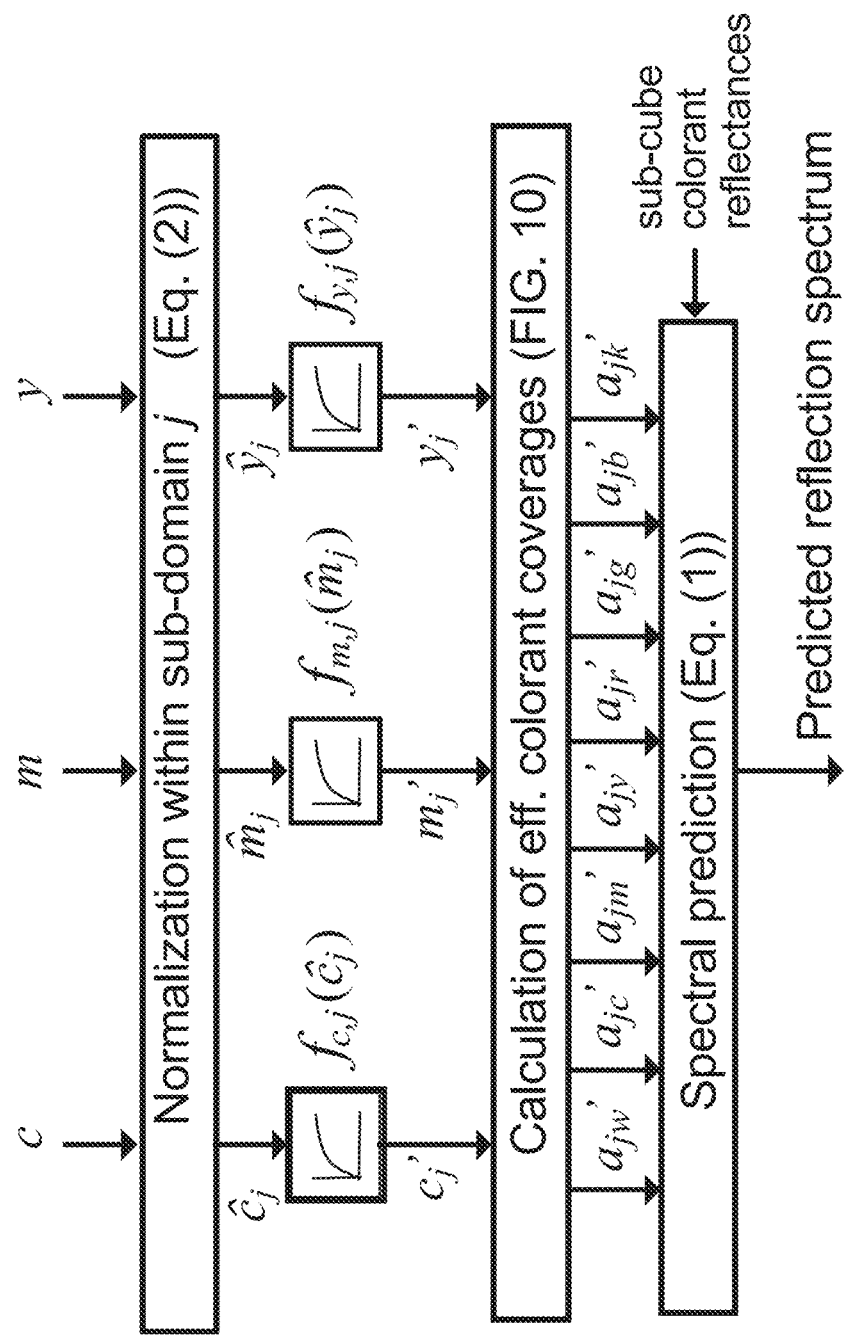
FIG. 12 shows the ink spreading enhanced cellular Yule-Nielsen modified spectral Neugebauer model (IS-CYNSN), for line-on-line ink halftones.

FIG. 12 shows the ink-spreading enhanced cellular Yule Nielsen prediction model, relying on line-on-line ink halftone superpositions. For given nominal ink surface coverages c, m and y, the spectral reflectance R(c, m, y) is predicted by locating the corresponding sub-cube j, calculating the normalized ink surface coverages (ĉ, m̂, ŷ), obtaining effective ink surface coverages $c_j'$, $m_j'$, $y_j'$ from the ink spreading curves, calculating the effective colorant area coverages $a_{ji}'$ from the line-on-line equations (table entries in FIG. 10) and inserting them into the YNSN equation (1). For model calibration, in the case of three inks, 27 patches are required for measuring the colorant reflectances and 8 additional patches are required for establishing the ink spreading curves. In total, 35 printed patches are needed to calibrate the 3 ink line-on-line halftone IS-CYNSN model. The IS-CYNSN model for line-on-line halftones is similar to the dot-on-dot halftone model described by [Balasubramanian 1999], with ink-spreading carried out as described by [Rossier and Hersch 2010].

6D Spectral Prediction Model for Cross-Halftones

A spectral prediction model creates the relation between the amounts of inks, i.e. the surface coverages of the ink halftones and the observed color by relying on predicted color halftone reflectances. In order to create interesting color changing effects with cross-halftones, we developed a special spectral model predicting the reflectance and therefore the color obtained when printing with the six ink surface coverages ($c_T$, $m_T$, $y_T$, $c_P$, $m_P$, $y_P$) of the superposed transverse and parallel line halftones. This model takes into account the directional optical dot gain. It enables predicting the reflectance of a halftone for the two considered azimuthal angles (0° and 90°) of the print.

Figure 14A:
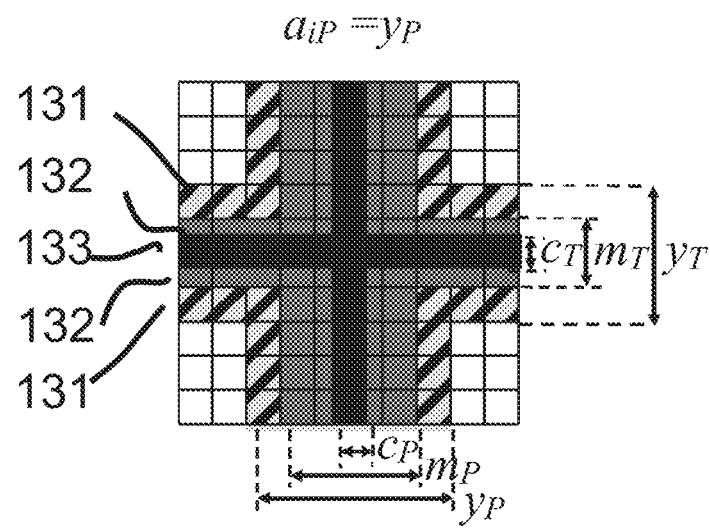
FIGS. 14A and 14B show a cross-halftone screen element with intersecting parallel and transverse line halftones comprising the pure metal (white, area Ni)), a parallel line halftone (area iP) formed by ink surface coverages ($c_P$, $m_P$, $y_P$) a transverse line halftone (area iT) formed by ink surface coverages ($c_T$, $m_T$, $y_T$), and an inked halftone center (area iPT) located at the intersection of the transverse and parallel line halftones.
Figure 14B:
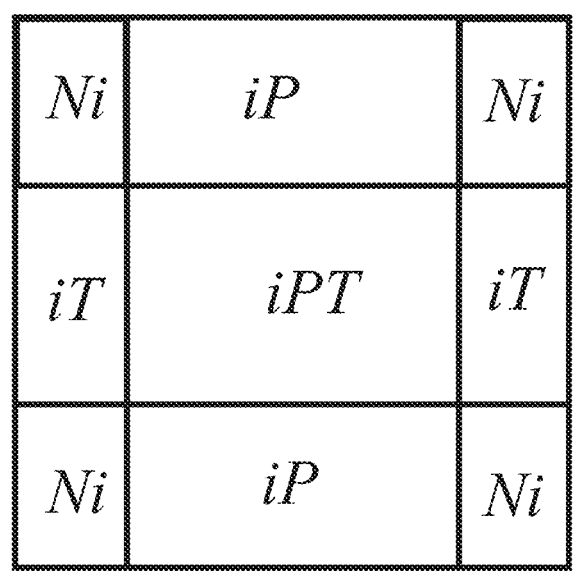

As explain in FIGS. 14A and 14B, the parallel and transverse halftone lines divide each cross-halftone screen element into four areas: non-inked metallic part (Ni), inked part with lines parallel to the orientation of the incident light (iP), inked part with transverse lines that are perpendicular to the orientation of the incident light (iT) and inked part formed by the intersection of the parallel and transverse lines (iPT).

Let us show how to create the model predicting the colors of the 6 ink cross-halftone before and after azimuthal rotation of the print. In a first step, we establish prediction models for predicting under specular reflection separately the reflectances of the parallel and transverse line halftones. In a second step, we deduce the reflectances of each of the parts (iP, iT, iTP) shown in FIG. 14B. In a third step, we assemble these parts by weighting their reflectances according to their surface coverages, applying the Yule-Nielsen modified spectral Neugebauer model described by formula (1).

Figure 13A:
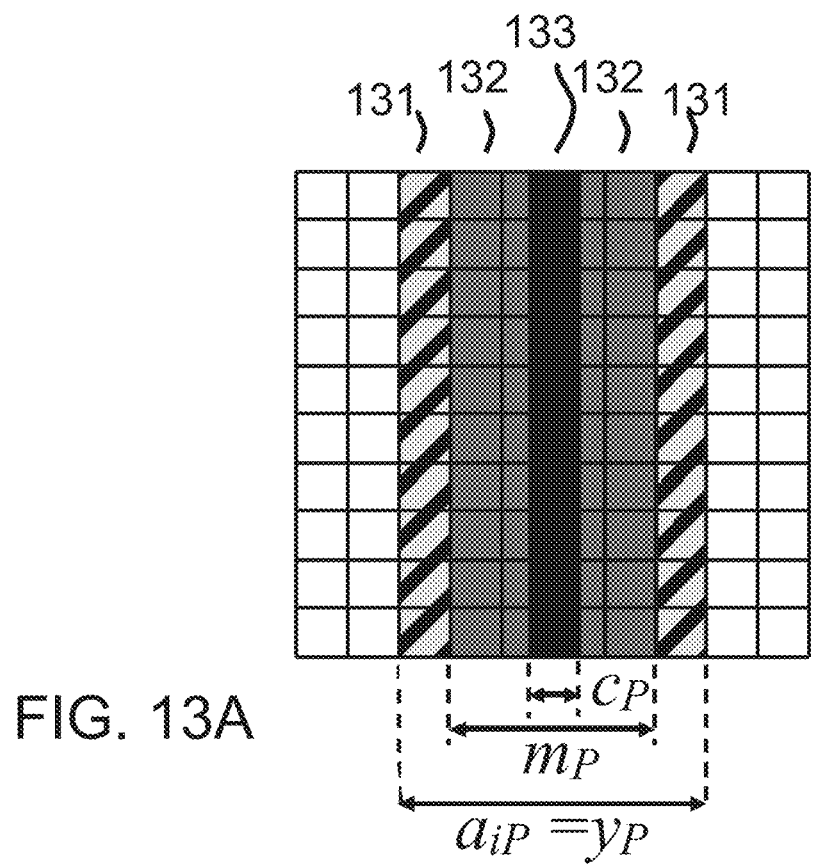
FIGS. 13A and 13B show a parallel and a transverse line halftone, respectively, with a first ink 131 on which a second ink 132 and a third ink 133 are superposed to form a line-on-line halftone.
Figure 13B:
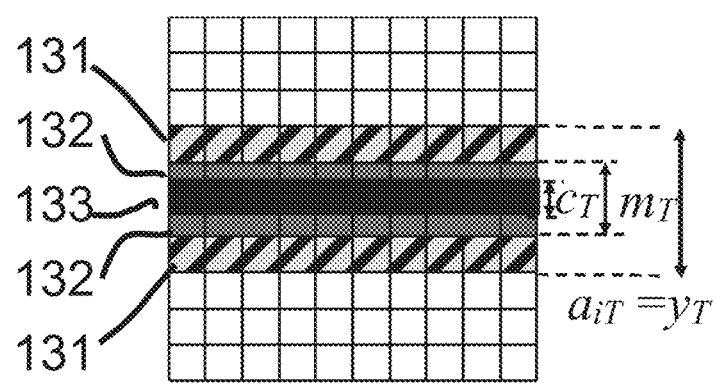

Let us first predict separately the reflectance $R_{HalftoneP}(\lambda)$ of the parallel line halftone (FIG. 13A) as a function of the parallel line ink surface coverages ($c_P$, $m_P$, $y_P$) as well as the reflectance $R_{HalftoneT}(\lambda)$ of the transverse line halftone (FIG. 13B) as a function of the transverse line ink surface coverages ($c_T$, $m_T$, $y_T$). We rely on two instances of the "Ink-spreading enhanced cellular Yule-Nielsen modified spectral Neugebauer model (IS-CYNSN)" for cyan, magenta and yellow line-on-line halftones, with one level of subdivision (see above, Section "The ink spreading enhanced cellular Yule-Nielsen modified spectral Neugebauer (IS-CYNSN) model for line-on-line halftones"). The first IS-CYNSN model predicts the reflectances of parallel line halftones and the second IS-CYNSN model predicts the reflectances of transverse line halftones.

In each IS-CYNSN model, the 3D c, m, y ink surface coverage space is divided into $2^3=8$ subcubes with vertices at 0, 50% and 100% nominal surface coverages of each of the inks. There are therefore $3^3=27$ primary reflectances. The ink spreading enhanced Yule-Nielsen modified spectral Neugebauer model (IS-YNSN) is separately applied on each subcube. To account for ink spreading, the central point within each sub-cube is printed and measured [Rossier and Hersch 2010]. The three effective cyan, magenta and yellow ink surface coverages are fitted to minimize the square difference between the measured spectral reflectance and the reflectance predicted by the YNSN model. With the fitted effective surface coverages of the 3 inks at the 8 combinations of 25% and 75% nominal surface coverages, the model constructs by linear interpolation in each sub-cube ink spreading curves mapping nominal to effective ink surface coverages (FIG. 11). In the case of parallel line halftones, the mapping is from ($\hat{c}_P$, $\hat{m}_P$, $\hat{y}_P$) to ($\hat{c}_P'$, $\hat{m}_P'$, $\hat{y}_P'$) and in the case of transverse line halftones, the mapping is from ($\hat{c}_T$, $\hat{m}_T$, $\hat{y}_T$) to ($\hat{c}_T'$, $\hat{m}_T'$, $\hat{y}_T'$).

The table of FIG. 15 shows that the two resulting line-on-line IS-CYNSN models are capable of accurately predicting reflectances under specular reflection both for the parallel and for the transverse line halftones. The predictions of the transverse line halftones are slightly less accurate, presumably due to the important dot gain.

In order to predict the reflectances of the different parts of a cross-halftone, we first derive the relative nominal and effective widths of the inked areas separately for the parallel (FIG. 13A) and the transverse (FIG. 13B) halftones. Since the inks are printed as "line-on-line", the width of the inked area corresponds to the largest ink surface coverage, i.e. for the nominal widths $$a_{iP}=\max(c_P,m_P,y_P)$$

$$a_{iT}=\max(c_T,m_T,y_T) \tag{3a}$$

and for the effective widths $$a_{iP}'=\max(c_P',m_P',y_P')$$

$$a_{iT}'=\max(c_T',m_T',y_T') \tag{3b}$$

Let us derive the reflectances of the inked areas present within the parallel (FIG. 13A) and within the transverse (FIG. 13B) line halftones.

Each line halftone of reflectance $R_{halftone(P|T)}(\lambda)$ is formed by a non-inked part of effective area $(1-a_{i(P|T)}')$ having the measured reflectance of metal $R_M(\lambda)$ and of an inked part of effective area $a_{i(P|T)}'$ having reflectance $R_{i(P|T)}(\lambda)$, where index (P|T) stands either for parallel (P) or transverse (T) line halftones. According to the YNSN model (formula (1)), the overall reflectance of a line halftone is $$R_{halftone(P|T)}^{1/n}(c_{(P|T)},m_{(P|T)},y_{(P|T)})=a_{i(P|T)}'R_{i(P|T)}^{1/n}+(1-a_{i(P|T)}')R_M^{1/n} \tag{4}$$

where n is the empirical scalar accounting for part of the optical dot gain.

By predicting with the IS-CYNSN model the reflectance $R_{halftone(P|T)}(\lambda)$ of the line halftone in function of the nominal ink surface coverages ($c_{(P|T)}$, $m_{(P|T)}$, $y_{(P|T)}$), we can deduce the reflectance $R_{i(P|T)}(\lambda)$ of the inked area of either a parallel or a transverse halftone as follows:

$$R_{i(P|T)}^{1/n}(c_{(P|T)}, m_{(P|T)}, y_{(P|T)}) = \frac{R_{halftone(P|T)}^{1/n}(c_{(P|T)}, m_{(P|T)}, y_{(P|T)}) - (1-a_{i(P|T)}')R_M^{1/n}}{a_{i(P|T)}'} \tag{5}$$

In order to estimate the reflectance of the intersection area (iPT in FIG. 14B), we first calculate the relative surface coverages of the 3 inks ($c_{iPT}$, $m_{iPT}$, $y_{iPT}$) within the inked intersection. We assume that in the intersection area iPT, the reflectance is approximately the average of the parallel and transverse area reflectances. We therefore calculate according to the IS-CYNSN model separately the reflectances of the inked parallel and transverse line halftones with these relative surface coverages and finally take the average of the two as the reflectance $R_{iPT}(\lambda)$ of the inked intersection.

The relative nominal surface coverages ($c_{iPT}$, $m_{iPT}$, $y_{iPT}$) of each ink at the inked intersection of the lines are obtained by adding the corresponding nominal ink surface coverages $u_P$ and $u_T$ of the parallel and transverse ink lines, each one normalized in respect to the nominal inked areas $a_{iP}$ and $a_{iT}$ (FIGS. 13A and 13B) respectively, and subtracting once the normalized surface coverage of their intersection:

$$u_{iPT} = \frac{u_P}{a_{iP}} + \frac{u_T}{a_{iT}} - \frac{u_P \cdot u_T}{a_{iP} \cdot a_{iT}} \tag{6}$$

where u stands for the nominal surface coverage of inks c, m or y.

The reflectance $R_{iPT}(\lambda)$ of the inked halftone part at the intersection of the two sets of inked lines is assumed to be the average of the parallel and transversal line reflectances, $R_{halftoneP}(\lambda)$ and $R_{halftoneT}(\lambda)$ respectively, predicted with the relative nominal surface coverages $c_{iPT}$, $m_{iPT}$, $y_{iPT}$ calculated according to Eq. (6):

$$R_{iPT} = \frac{R_{halftoneP}(c_{iPT}, m_{iPT}, y_{iPT}) + R_{halftoneT}(c_{iPT}, m_{iPT}, y_{iPT})}{2} \tag{7}$$

According to the YNSN model, we obtain the overall reflectance of the screen element (FIG. 5c), by taking the reflectances of the individual parts and weighting them according to their effective surface coverages. The areas iP, iT, iPT, Ni within the halftone (FIG. 14B) have the effective surface coverages $a_{iP}' \cdot (1-a_{iT}')$, $a_{iT}' \cdot (1-a_{iP}')$, $a_{iP}' \cdot a_{iT}'$, $(1-a_{iP}') \cdot (1-a_{iT}')$, respectively. We obtain:

$$R_{total}(\lambda)^{1/n} = a_{iP}' \cdot (1-a_{iT}') R_{iP}(\lambda)^{1/n} + a_{iT}' \cdot (1-a_{iP}')$$
$$R_{iT}(\lambda)^{1/n} + a_{iP}' \cdot a_{iT}' \cdot R_{iPT}(\lambda)^{1/n} + (1-a_{iP}')(1-a_{iT}')$$
$$R_M(\lambda)^{1/n} \tag{8}$$

where $R_{iP}(\lambda)$ is the reflectance of the inked halftone lines parallel to the incident light with low directional dot gain, $R_{iT}(\lambda)$ is the reflectance of the inked transverse halftone lines with high directional dot gain, $R_{iP}(\lambda)$ is the reflectance of the inked intersection area, $R_M(\lambda)$ is the measured reflectance of the unprinted metallic or metallized surface.

The predicted spectral reflectance (and color) of a cross-halftone $R_{total}(c_P, m_P, y_P, c_T, m_T, y_T)$ is calculated by first predicting the reflectances of the parallel and of the transverse line halftones, i.e. $R_{halftoneP}(c_P, m_P, y_P)$ and $R_{halftoneT}(c_T, m_T, y_T)$ with the ink-spreading enhanced cellular Yule-Nielsen modified Neugebauer model (IS-CYNSN). Then, with Eqs. (3a) and (3b), one computes with the surface coverages of the inks both the nominal and effective sizes of the parallel and of the transverse line areas within a screen element, i.e. $a_{iP}$, $a_{iP}'$, $a_{iT}$, $a_{iT}'$. This enables computing according to Eq. (5) the reflectances of the inked areas $R_{iP}$ and $R_{iT}$ of the line halftones. For the intersection area $a_{iP} \cdot a_{iT}$, the relative surface coverages $c_{iPT}$, $m_{iPT}$, $y_{iPT}$ of the superposition of parallel and transverse lines are computed according to Eq. (6). The reflectance $R_{iPT}$ of the intersection area is calculated according to Eq. (7). Finally the reflectance of the whole halftone $R_{total}$ is assembled from the reflectances of the areas according to Eq. (8).

When rotating the print by a 90° azimuthal rotation, the parallel and transverse ink surface coverages get exchanged. The resulting halftone reflectance is calculated in the same way as above, but with $R_{total}(c_T, m_T, y_T, c_P, m_P, y_P)$.

In order to test the prediction accuracy of the overall model, we printed halftones at all nominal c, m, y ink combinations of 0%, 40% and 80% for both the parallel and the transverse ink surface coverages. This yields $3^6 = 729$ test halftone samples for the set of 6 inks $(c_P, m_P, y_P, c_T, m_T, y_T)$. These test samples are completely distinct from the calibration samples and cover a large part of the reproducible color space. The two IS-CYNSN models for predicting the $R_{halftoneP}$ and $R_{halftoneT}$ reflectances require a total of 35*2−8=62 patches for their calibration (8 fulltone colorants are the same for parallel and transverse halftones and are measured only once). In all reflectance weighting equations, the n-value is set to 14. FIG. 16 shows the prediction accuracy for the proposed 6 ink cross-halftone spectral prediction model. The average prediction accuracy is approximately half the prediction accuracy of the single orientation parallel or transverse line halftones (FIG. 15). This prediction accuracy is good, since with a calibration set of only 62 patches, 729 colors are predicted.

Optimization Formula for a Desired Color Shift

Thanks to halftone screens incorporating parallel and transverse cyan, magenta and yellow lines of freely choosable width, one may create one color in non-rotated viewing mode and a second color in rotated viewing mode. The prediction model developed in the previous section enables, by varying the six ink surface coverages $(c_P, m_P, y_P, c_T, m_T, y_T)$ to explore the space of possible pairs of colors that appear before and after 90° azimuthal rotation of the print.

Equation (9) yields the optimal surface coverages of the inks that minimize the sum of $\Delta E_{94}$ color distances between a pair of desired non-rotated and rotated colors and the pair of resulting printable non-rotated and rotated colors:

$$\{cmy_P, cmy_T\} = \arg \min(\Delta E_{94}(Lab(cmy_P, cmy_T),$$
$$Lab_{InNR}) + \Delta E_{94}(Lab(cmy_T, cmy_P), Lab_{InR}))$$

Subject to $0 \leq \{c_P, m_P, y_P, c_T, m_T, y_T\} \leq 1$ (9)

where $cmy_P$ stands for the nominal surface coverages $(c_P, m_P, y_P)$ of the parallel lines of the cross-halftone, $cmy_T$ stands for the nominal surface coverages $(c_T, m_T, y_T)$ of the transverse lines of the cross-halftone, where $Lab(cmy_P, cmy_T)$ is the color predicted in non-rotated mode, where $Lab(cmy_T, cmy_P)$ is the color predicted in rotated mode and where $Lab_{InNR}$ and $Lab_{InR}$ are the desired colors in non-rotated and rotated modes, respectively.

The color predictions $Lab(cmy_P, cmy_T)$ and $Lab(cmy_T, cmy_P)$ are obtained by calculating with Eq. (8) the reflectances $R_{total}(cmy_P, cmy_T)$ and $R_{total}(cmy_T, cmy_P)$. These reflectances are converted to CIE-XYZ tri-stimulus values and to CIELAB. The optimization of Eq. (9) is performed by applying the "Bound Optimization By Quadratic Approximation" method, see M. J. D. Powell 2009. The BOBYQA algorithm for bound constrained optimization without derivatives, Cambridge NA Report NA2009/06, University of Cambridge, UK.

In order to offer a high-speed access to the optimal surface coverages obtained by solving Eq. (9), we create a 6-dimensional desired color table comprising as entries the desired color coordinates $Lab_{InNR}$ of the non-rotated print and the desired color coordinates $Lab_{InR}$ of the rotated print. The L* coordinate is sampled from 20 to 100 in steps of 8, a* is sampled from −60 to 84 in steps of 6 and b* is sampled from −70 to 98 in steps of 7, providing a total of 11·25·25=6875 CIE L*a*b* coordinates. For all 6 coordinates, the table has $6875^2 = 47,265,625$ entries. At each entry, the optimal nominal surface coverages $(c_P, m_P, y_P, c_T, m_T, y_T)$ of the cross-halftone are listed.

Exploring the Space of Hue, Chroma and Lightness Shifts

Figure 17:
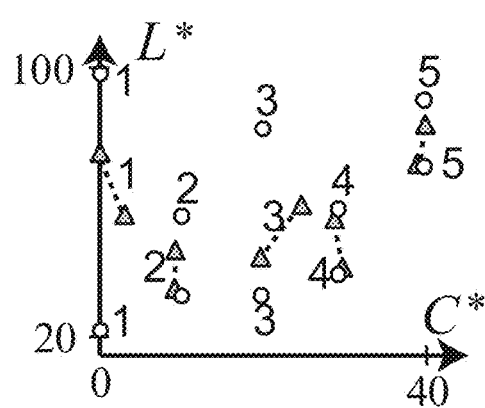
FIG. 17 shows desired pairs ("circles") and achievable pairs ("triangles") of colors incorporating lightness shifts upon in-plane rotation of the print by 90°.

Let us explore how far it is possible to modify the hue, chroma and the lightness of colors when rotating the print in-plane by 90° under specular reflection. Equation (9) enables specifying a desired color before rotation and a desired modified color after 90° in-plane rotation. The obtained surface coverages $(c_P, m_P, y_P, c_T, m_T, y_T)$ yield the achievable color Lab(cmy$_P$, cmy$_T$) before rotation and the achievable color Lab(cmy$_T$, cmy$_P$) after rotation. FIG. 17 shows examples where the pairs of desired colors ("circles") contain only a shift in lightness. One can observe that, if a large lightness difference is desired, the achievable lightness difference is moderate. In certain cases, the chroma also slightly changes (e.g. samples 1 and 3).

Figure 18A:
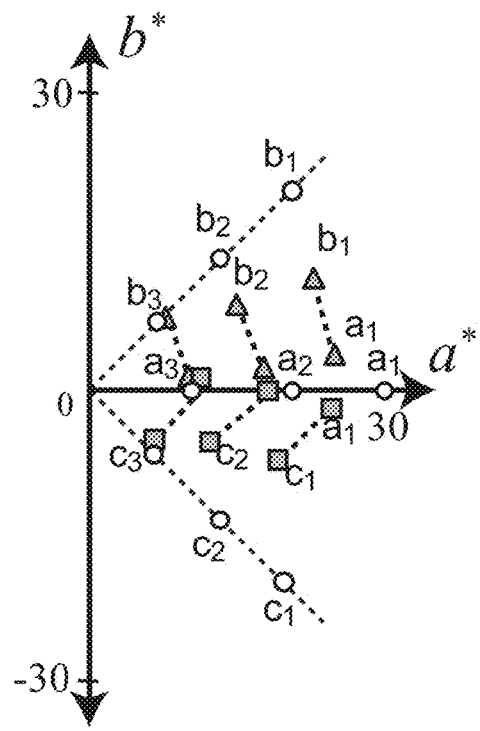
FIGS. 18A and 18B show desired 45° and 90° hue shifts, respectively, with "circles" ($a_1$-$b_1$, $a_2$-$b_2$, $a_3$-$b_3$, $a_1$-$c_1$, $a_2$-$c_2$, $a_3$-$c_3$) giving pairs of desired initial and hue-shifted colors and "triangles" or "squares" giving the pairs of corresponding achieved initial and hue shifted colors, the shifted colors appearing when rotating the print by 90°.
Figure 18B:
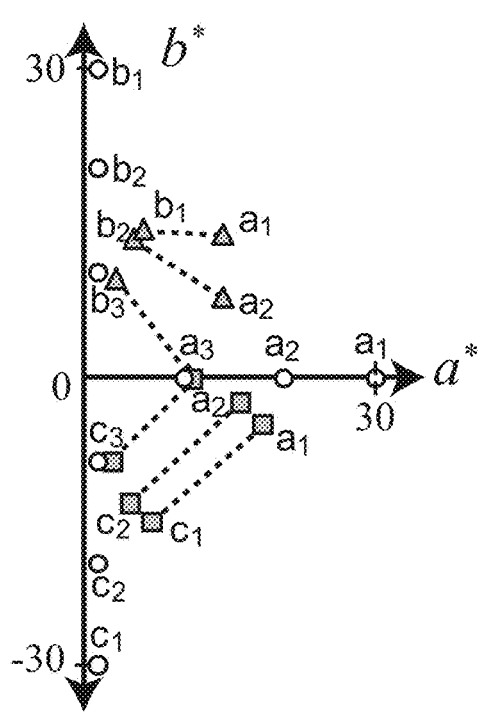

FIGS. 18A and 18B show examples of desired hue shifts (white "disks"). One can verify that desired and achievable hue shifts are close one to another when the chroma is not higher than C*=10 (samples $a_3$-$b_3$ and $a_3$-$c_3$). Desired hue shifts at chroma values 10<C*<20 are slightly attenuated (samples $a_2$-$b_2$ and $a_2$-$c_2$) and desired hue shifts at chroma values C*≥20 are considerably attenuated.

Figure 19:
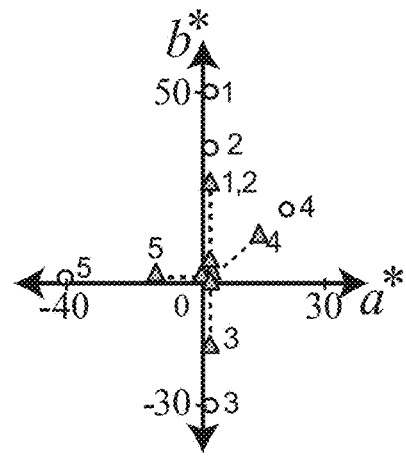
FIG. 19 shows initial chroma values ("circles") to be reduced to a very low chroma (C*≈0) upon in-plane rotation, i.e. reduced to achromatic colors, as well as the achievable printable colors on the non-rotated and rotated print that are shown as triangles.

FIG. 19 shows examples of desired and achieved chroma shifts. Chroma shifts towards achromatic colors are always possible. Such chroma shifts are useful for transforming a color image into a grayscale image by rotating the print. Important chroma changes do not significantly affect the lightness.

Note that in all examples, the color changes can be inversed, e.g. from the shifted hue to the non-shifted hue and from achromatic colors to chromatic colors. To be more precise, exchanging Lab$_{InNR}$ and Lab$_{InR}$ in Eq. (9) yields the same set of surface coverages, but with the solutions cmy$_P$ and cmy$_T$ exchanged.

The set of colors achievable in rotated mode is obtained by first creating a cross-halftone surface coverage to color table mapping in steps of 5% the 6 surface coverages ($c_P$, $m_P$, $y_P$, $c_T$, $m_T$, $y_T$) to non-rotated and rotated colors. We associate to each of the $21^6$=8576612 entries of this cross-halftone color table both the corresponding non-rotated and rotated colors calculated according to the 6-ink spectral prediction model. We then search in this table all possible surface coverages in a small neighbourhood around the initial non-rotated color (0<{|ΔL*|, |Δa*|, |Δb*|}<1.5). With this set of surface coverages, we predict the corresponding colors in rotated mode.

We conclude that the potential for important lightness shifts is low, but that significant hue and chroma shift are possible for colors that have medium to low chroma values. Pictures with medium and low chroma look generally less colorful than pictures with high chroma colors. Nevertheless, due to the Hunt effect which states that when the luminance of a given color increases, its perceived colorfulness also increases, samples of low chroma colors printed on metal and viewed under specular reflection appear to be colorful, see Hunt, R. W. G. Light and dark adaptation and the perception of color, *J. Opt. Soc. Am.* 42, 190-199 (1952).

Another important limitation of 90° cross-halftone rotation is that two colors having the same desired non-rotated color and different rotated colors may show a ghosting effect on the achieved non-rotated colors. This is due to the fact that the joint optimization of desired non-rotated and rotated colors according to formula (9) modifies the non-rotated colors by an amount that depends on the desired rotated colors. This can be deduced from FIG. 18A, where the achieved initial colors (e.g. the positions of "triangle" $a_1$ and "square" $a_1$) depend on the rotated colors ("circle" $b_1$ and "circle" $c_1$). However, for gamuts that are limited in their chroma and lightness values, the ghosting effect becomes very small and is therefore barely visible.

The presently analyzed color changing effects are, in addition to hue variations, primarily applied for hue changes, decolorization or independent color changes. Upon 90° in-plane rotation, image parts may take upon rotation hues that are different from the non-rotated hues, chromatic image parts may become achromatic, achromatic image parts may become chromatic, the lightness of images may undergo moderate changes or combined hue, chroma and lightness variations (called "color changes") may be achieved.

Print Gamut and Constrained Color Variation Sub-Gamuts

Classic color reproduction workflows generally comprise a gamut-mapping step where input colors, e.g. sRGB display colors, are mapped into the gamut of the printable colors, e.g. the colors formed by the classic set of CMYK inks, see J. Morovic, J. Lammens, Color Management, in Colorimetry: Understanding the CIE system, (Ed. J. Schanda), Chapter 7, J. Wiley, 159-206 (2007). Since we would like to print CMY color images on the metallic substrate and view them under specular reflection, we need to establish the gamut of print colors that can be viewed under specular reflection.

In addition, we would like to create images that upon azimuthal rotation of the print by 90° provide color variations such as variations of hue, variations from chromatic to achromatic colors (decolorization) or combined variations of hue, chroma and to some extent lightness. For this purpose, we need to establish the subset of printable colors (sub-gamut) that comprise those colors, whose ink surface coverages provide the freedom to achieve the desired color variations. The sub-gamut comprising colors providing the freedom to achieve any target hue from any starting hue is called the hue variation sub-gamut. The sub-gamut comprising all colors providing the freedom to achieve a full decolorization, i.e. a shift from chromatic colors to achromatic colors is called the decolorization sub-gamut. The sub-gamut comprising all colors providing the freedom to freely specify a color change, i.e. a color change incorporating a combination of hue, chroma and lightness variations is called either independent color variation sub-gamut or independent color change sub-gamut.

Color reproduction of pairs of input images incorporating hue variations, decolorization or independent color variations upon 90° rotation of the print requires projecting the colors present in the two input images, e.g. sRGB display colors, into the corresponding sub-gamut.

Figure 20A:
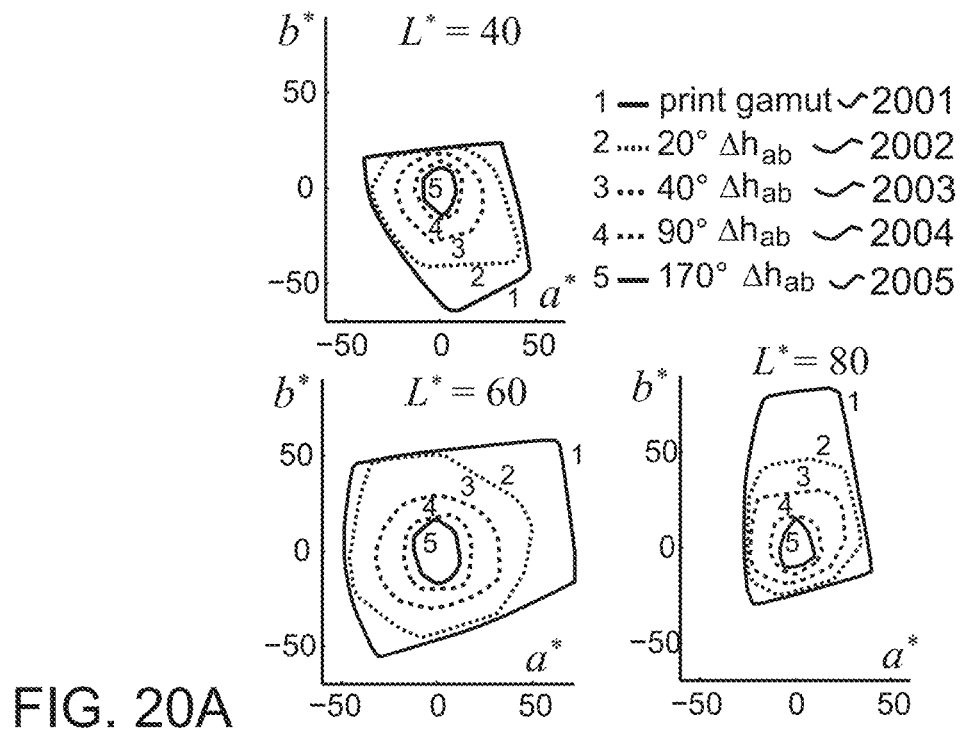
FIG. 20A shows the print gamut 2001 and the sub-gamuts allowing for specific hue shifts $\Delta h_{ab}$, where any color within each sub-gamut can achieve the corresponding hue shift while keeping the achieved non-rotated color equal to the desired non-rotated color.

The experiments shown in the previous section teach that large hue changes can only be achieved with low chroma colors. Small hue changes however can be carried out with higher chroma colors. FIG. 20A shows sub-gamuts of colors supporting a given hue change, with the print gamut 2001, the Δh$_{ab}$=20° hue variation sub-gamut 2002, the Δh$_{ab}$=40° hue variation sub-gamut 2003, the Δh$_{ab}$=90° hue variation sub-gamut 2004, and the Δh$_{ab}$=170° hue variation sub-gamut 2005. The gamut and sub-gamut boundaries specify the achievable ranges of chroma and lightness.

Sub-gamuts of colors specifying those colors that after rotation show a hue shifted from the initial color by an angle Δh$_{ab}$ are obtained by accessing the cross-halftone surface coverage to color table, see Section "Exploring the space of hue, chroma and lightness shifts" and for a given non-rotated color Lab$_{NR}$, select those surface coverages that produce a non-rotated color within a window of e.g. (ΔL*, Δa*, Δb*)=(±1.5, ±1.5, ±1.5) of the given color. On these surface coverages, we verify if one of the surface coverages produces upon quarter turn rotation a "rotated" color that has a hue shift equal or larger than Δh$_{ab}$. If this is the case, the corresponding "non-rotated" color Lab$_{NR}$ is said to belong to the sub-gamut that provides freedom for a hue shift of Δh$_{ab}$. We repeat this procedure on all CIELAB colors that are inside the printable gamut, i.e. colors that are present in the cross-halftone color table. All colors that provide freedom for the given hue shift form the sub-gamut.

A similar procedure is applied to obtain the decolorization sub-gamut. On the surface coverages producing a non-rotated color within a window e.g. of $(\Delta L^*, \Delta a^*, \Delta b^*) = (\pm 1.5, \pm 1.5, \pm 1.5)$ of the given color, we verify if one of the surface coverages produces a decolorized color, i.e. a color having chroma lower than a given value, e.g. $C^* < 3$.

A similar procedure is also applied to obtain the independent color variation sub-gamut. Among the sets of surface coverages producing a non-rotated color within a window e.g. of $(\Delta L^*, \Delta a^*, \Delta b^*) = (\pm 1.5, \pm 1.5, \pm 1.5)$ of the given color, we verify if one set of surface coverages produces a hue change of at least 170°, if an other set of surface coverages provides the lightness of a pseudo-white, e.g. a lightness of $L^* \geq 70$ and if a further set of surface coverages provides the lightness of a pseudo-black, e.g. a lightness of $L^* \leq 50$. If these conditions are fulfilled, then the current color is part of the independent color variation sub-gamut. For such colors, cross-halftone surface coverages can be selected which may create upon quarter turn rotation a pseudo-white, a pseudo-black or any desired hue.

Let us hereinafter call the hue-shifted sub-gamut, the decolorization sub-gamut and the independent color variation sub-gamut by the global term "constrained color variation sub-gamuts".

In a complex input image colorization task, upon rotation of the print, some parts can undergo an important hue shift while other parts remain with the same hue. Therefore, there is no necessity to reduce the chroma of all image parts by mapping their colors to the maximal $\Delta h_{ab} = 180°$ hue variation sub-gamut. Instead, we propose to associate a value $\rho$ to every image region that undergoes a hue shift, with $0 \leq \rho \leq 1$. Value $\rho$ indicates the relative proximity of the considered color between the maximal hue variation sub-gamut ($\rho=1$) and the full print gamut ($\rho=0$). Regions that remain with the same color after rotation of the print have a value of $\rho=0$.

In a real application, the designer may specify the image regions whose hues are to be changed. This may be carried out with a software package such as Photoshop. He shall specify on these regions the hue that should appear after rotation of the print. The software will then show a preview of the achieved initial and hue-shifted colors. The designer may then with a slider reduce the $\rho$ value and therefore allow higher chroma values by tolerating, that the achieved non-rotated colors deviate towards the achieved modified hue.

Gamut-mapping to the target subgamut specified by the $\rho$ value is performed by linearly interpolating between values obtained by gamut-mapping into the two sub-gamuts that have p values enclosing the desired $\rho$ value. Pre-computed sub-gamuts are the sub-gamuts allowing a hue shift of $\Delta h_{ab}=0°$ (print gamut, $\rho=0$), $\Delta h_{ab}=45°$ ($\rho=0.25$), $\Delta h_{ab}=90°$ ($\rho=0.5$), $\Delta h_{ab}=135°$ ($\rho=0.75$), and $\Delta h_{ab}=180°$ (maximal hue-variation sub-gamut, $\rho=1$).

Synthesizing the Color Image with the Desired Hue, Chroma or Color Variations

Figure 22:
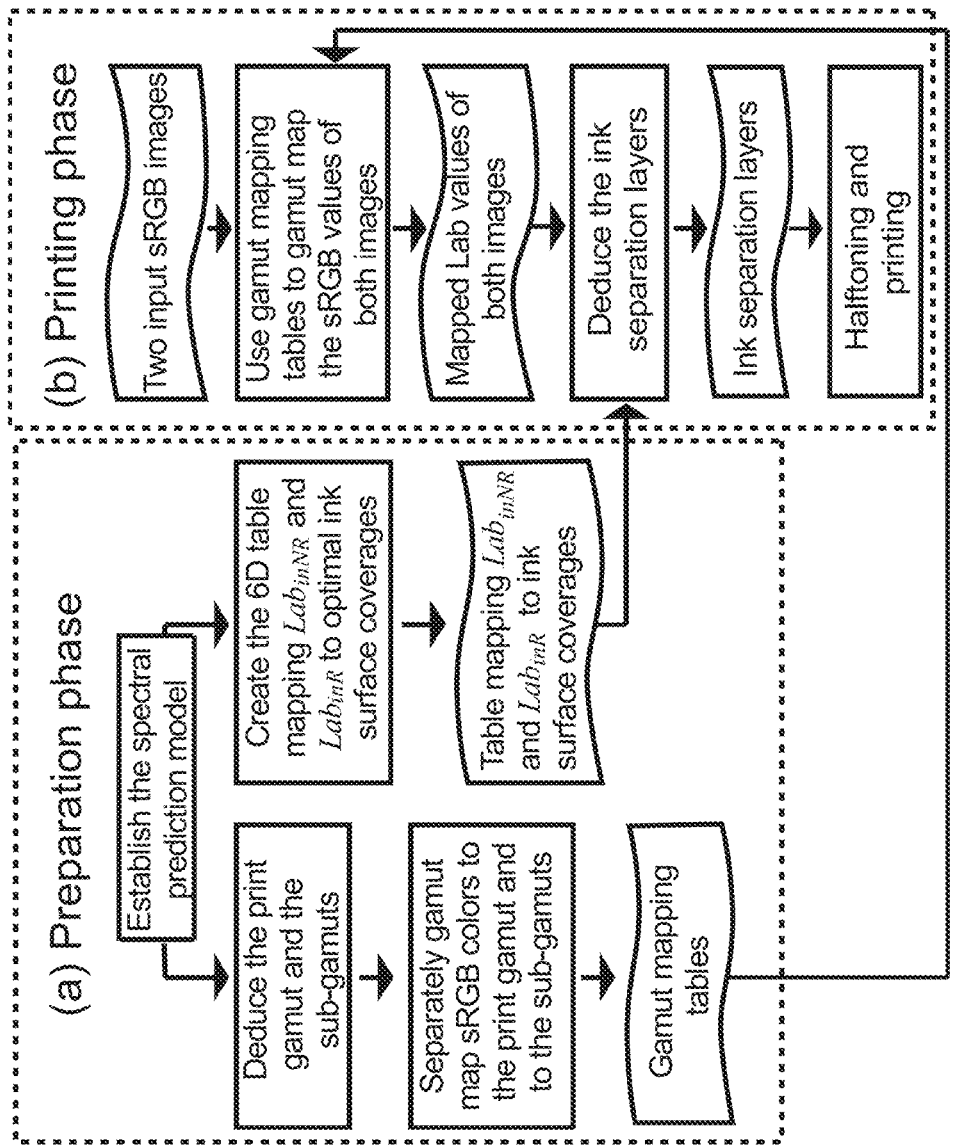
FIG. 22 shows the color reproduction workflow specific for creating images incorporating the color changing effects that are viewable under specular reflection.

The present color reproduction workflow consists of a preparation phase and of a printing phase. The preparation phase consists of characterizing the printer by calibrating the model predicting the reflection spectra of the cyan, magenta and yellow crossline halftones, establishing the print gamut, the target hue-shifted sub-gamut, the maximal hue variation sub-gamut, the decolorization sub-gamut and the independent color changing sub-gamut, creating the tables mapping input sRGB values to these gamut and sub-gamuts, as well as creating the 6-dimensional desired color table describing the correspondence between the two input desired CIELAB values and the optimal surface coverages of the inks (FIG. 22, preparation phase).

The sub-gamuts associated to the hue shifts of 0°, 45°, 90°, 135° and to maximal hue variations of 180° are created by selecting the sets of achieved non-rotated colors allowing for these hue shifts and by computing the non-convex hull of these colors in the CIELAB space, see the article by Bernardini, F., Mittleman, J., Rushmeier H, Silva, C., and Taubin, G. The Ball-Pivoting Algorithm for Surface Reconstruction, IEEE Trans. Vis. and Comp. Graph. 5, 4, 349-359 (1999), hereinafter referenced as [Bernardini et al. 1999]. FIG. 20A illustrates examples of sub-gamuts allowing hue shifts of $\Delta h_{ab}$ of 20° (2002), 40° (2003), 90° (2004) and 170° (2005).

Figure 20B:
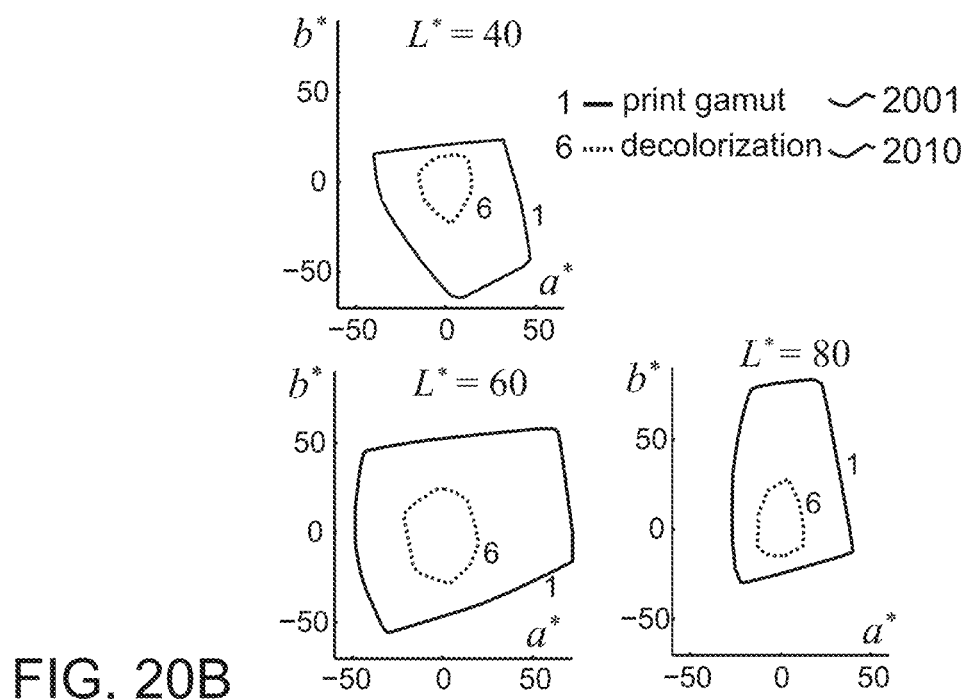
FIG. 20B shows the print gamut 2001 and the corresponding decolorization sub-gamut 2010, allowing chroma shifts from chromatic colors inside the gamut to achromatic colors and vice-versa.
Figure 21:
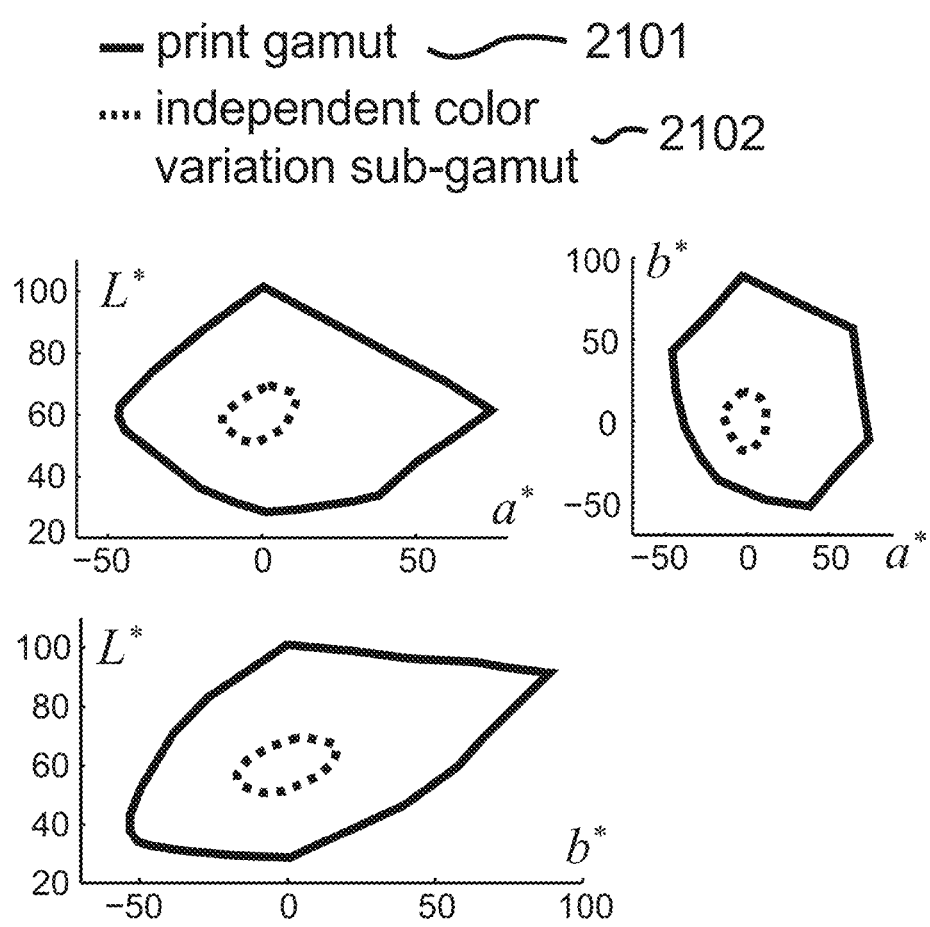
FIG. 21 shows projections on the L*a*, L*b* and a*b* planes of the print gamut 2101 and of the independent color changing sub-gamut 2102 allowing to produce a rotated color image that is independent of the non-rotated image.

A similar procedure is applied to obtain the decolorization sub-gamut (FIG. 20B, 2010 and the sub-gamut providing freely chosen color variations (FIG. 21, 2102). The print gamut (FIGS. 20A, 20B, 2001, FIG. 21, 2101) is obtained (i) by predicting with the 6D prediction model for cross-halftones the colors that are obtained in non-rotated mode when varying the surface coverages of the 6 inks and (ii) by computing the non-convex hull of these colors, in the same way as mentioned above.

The tables describing the gamut mappings are created by sampling the sRGB space by steps of 5%, converting sRGB values to CIELAB and mapping them separately onto the print gamut and onto the different sub-gamuts by applying a two-foci gamut-mapping algorithm, see J. Morovic, M. R. Luo, The fundamentals of gamut mapping: a survey, Journal of Imaging Science and Technology 45, 3, 283-290 (2001). The 6-dimensional desired color table describing the relationship between two CIELAB values and the 6 ink surface coverages is created as described at the end of Section "Optimization formula for a desired color shift".

The printing phase consists in two input sRGB images specifying the colors before and after 90° in-plane rotation of the print as well as possibly a map with the $\rho$ values. The second sRGB image differs from the first image by incorporating the desired hue shifts and/or the desired decolorization and/or the desired independent color changes. Using the previously established gamut-mapping tables, pairs of colors from the two images are mapped to the print gamut and to the sub-gamuts allowing for hue changes, decolorization or independent color changes. For hue shifts, parameter $\rho$ defines by interpolation the colors of the gamut mapped RGB values, see Section "Print gamut and constrained color variation sub-gamuts". The resulting pair of gamut mapped colors is then used to access the 6-dimensional desired color table yielding the 6 surface coverage values for creating the cross-halftone, 3 surface coverages for the parallel halftone lines and 3 surface coverages for the transverse halftone lines.

The cross-halftoned ink separation layers are created by first creating with dithering techniques known in the art the parallel and the transverse line halftones, separately for each ink layer. Then the cross-halftone is created by applying an "OR" operation between the parallel and the transverse line halftoned ink layers of the same ink. For cyan, magenta and yellow inks, this results in the three cross-halftoned ink separation layers that are sent to the printer.

Figure 23A:
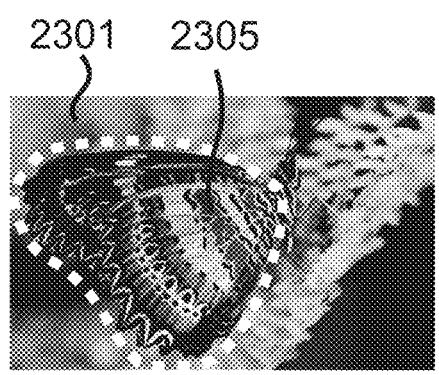
FIG. 23A shows schematically the non-rotated butterfly with red 2305 foreground colors and green 2301 background colors and FIG. 23B the rotated hue modified butterfly image with cyan 2306 foreground colors and magenta 2302 background colors, printed on metal and viewed under specular reflection.
Figure 23B:
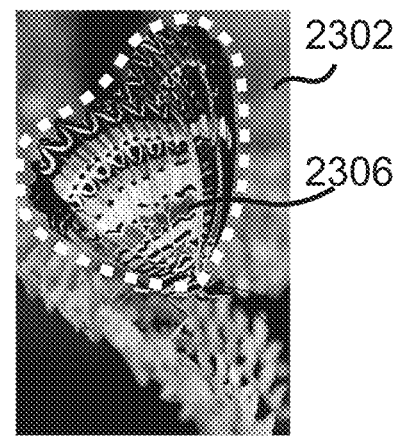

Examples of Images Showing Hue Changes, Decolorization or Recolorization and Independent Color Changes Let us first schematically show hue changing as well as decolorization or recolorization examples. The butterfly image with hues close to the original hues is shown in FIG. 23A and the hue modified butterfly is shown in FIG. 23B. In the present example, the hues of the background have evolved from green 2301 to violet 2302 and of the wings from red-orange 2305 to blue 2306. The hue modified butterfly appears when rotating under specular reflection the print in-plane by 90 degrees.

Figure 24A:
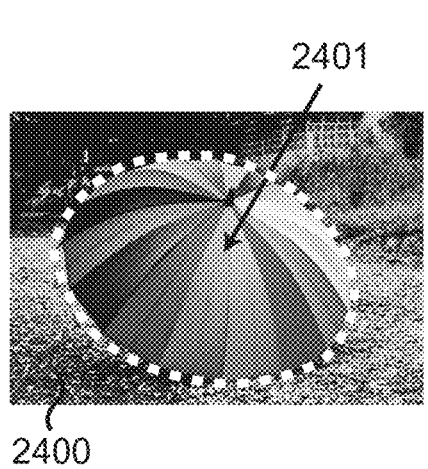
FIG. 24A shows schematically the non-rotated initial "gray" 2401 and FIG. 24B the rotated "chromatic" umbrella image, with magenta 2402, cyan 2403, yellow 2404, orange 2405 and red 2406 sections printed on metal and viewed under specular reflection.
Figure 24B:
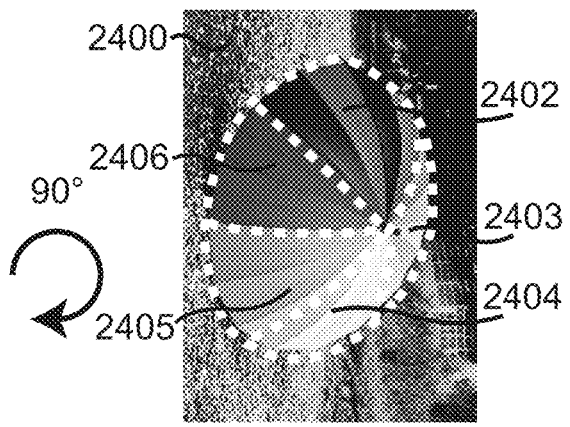

The "decolorization" example shown in FIGS. 24B and 24A rely on a first original colored image and on a second grayscale image obtained by simply reducing the chroma of the original image colors to zero, i.e. transforming the colored image into a grayscale image. However, for the viewers, it is more spectacular to have the grayscale image as non-rotated image (FIG. 24A) and then by turning the print, let the colors appear (FIG. 24B: recolorization). For recolorization, we can therefore consider the achromatic image as desired non-rotated image (FIG. 24A) and the chromatic image as desired rotated image (FIG. 24B). In FIGS. 24A and 24B, the background remains of the same color 2400, the gray umbrella 2401 become a multi-color umbrella, with magenta 2402, cyan 2403, yellow 2404, orange 2405 and red 2406 sections.

Figure 25B:
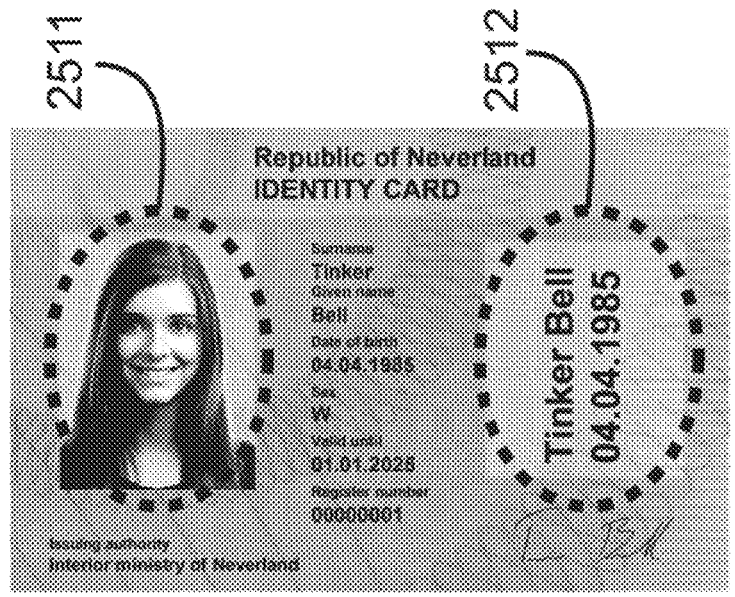
FIG. 25B shows the same identity card image, but 90° in-plane rotated, where the front view of the face appears now in gray 2511 and where gray text related to the ID card holder appears on the right side 2512.

For security purposes, one may conceive an identity document where the front view of the face appears in color (FIG. 25A, 2501) and, upon rotation becomes gray (FIG. 25B, 2511) and where the side view of the face is gray in non-rotated mode (FIG. 25A, 2502) and upon rotation, disappears and is replaced by text in gray (FIG. 25B, 2512).

Figures 26A, 26B, 26C:
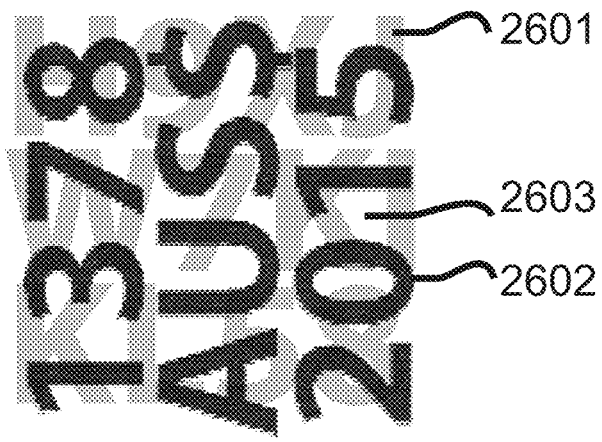
FIG. 26A shows the images of two messages covering the same location of a metallic print, one appearing in non-rotated mode (2601, schematically represented by gray letters) and the other that appears in rotated mode (2602, schematically represented by black letters)
FIG. 26B shows how the first message appear, with a first color or gray value 2610 for the background elements and a second color or gray value 2611 for the foreground elements (letters)
FIG. 26C shows how the second image appears upon 90° rotation of the print, with the background having a third color or gray value 2620 and the foreground having a fourth color or gray value 2621, where all 4 color or gray values may be different.
Figure 29:
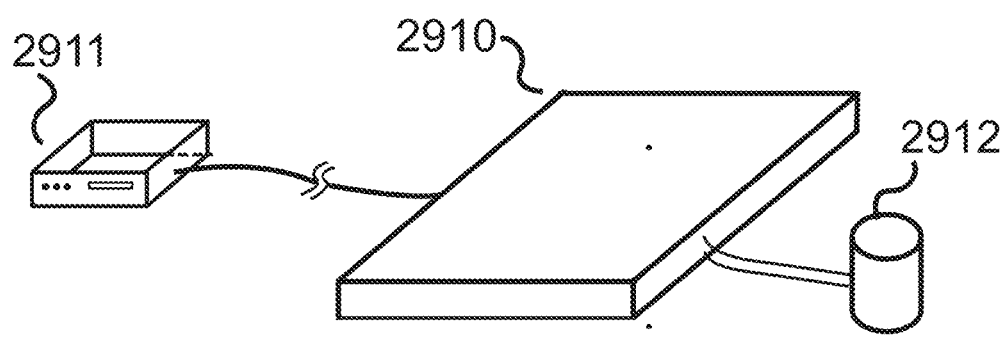
FIG. 29 shows a computing system for embedding color images on a metallic print that change colors upon in-plane rotation.

As a first example of independent color changes, FIG. 26A shows two message images embedded into the same metallic print area. A first message image appears in non-rotated mode (FIG. 26B) with background color 2610 and foreground color 2611 and a second message image appears upon 90° in-plane rotation with background color 2620 and foreground color 2621. Since the second message image is laid out in vertical direction (FIG. 26A, 2602), upon 90° in-plane rotation, this second message appears horizontally (FIG. 26C). Background and foreground colors of both message images can be freely chosen. The authenticity of a document incorporating the image with the two messages may be verified by making sure that only the first message appears in non-rotated mode and only the second message appears in rotated mode and that the displayed colors are the ones that should be displayed. In addition, when displaying the non-rotated image and the rotated image in front of a smartphone, the software of the smartphone may recognize the messages and verify by communicating with a server over the Internet that the two messages are authentic.

A similar example of a print area embedding two independent color images is shown in FIGS. 27A, 27B and 27C, with the goal of showing two independent QR codes of varying colors or gray levels when rotating a same metallic print. Two QR-code images are embedded within one print area by giving as input the two QR code images as either color or grayscale images, to be imaged as independently color varying images. Under specular reflection, the first QR-code "QR1" is visible in non-rotated mode (FIG. 27B) and the second QR-code "QR2" is visible (FIG. 27C) by applying a 90° in-plane rotation to the print. Let us call the "black" dots of the QR-code image foreground dots and the white dots background dots. In non-rotated mode, the color of the QR1 foreground dots must have a color or grayscale value different from the color of the background dots. In rotated mode, the color of the QR2 foreground dots must have a color or grayscale value different from the color of the background dots. Software running on a smartphone or tablet may acquire the image in rotated and non-rotated modes, apply preprocessing operations to enhance the contrast between foreground and background dots, decode the message content, display it and possibly verify by communicating with a server over the Internet that the two QR code messages are authentic.

Let us consider a further example of two independent color pictures embedded within one metallic print image, showing the first picture before rotation and a second independent picture after applying a 90° in-plane rotation to the print. FIG. 28A shows schematically the combined image with the two overlaid independent color pictures, the first picture being shown in the figure in light gray tones and the second picture shown in the figure as dark gray tones. FIG. 28B represents the first color picture, shown in the figure as a gray image and FIG. 28B shows the second picture, shown in the figure as a gray image.

Steps for Producing Color Images that Change their Colors Upon in-Plane Rotation The steps to be carried out are either part of the preparation phase or part of the printing phase. They can be deduced from the reproduction workflow described in FIG. 22.

The steps of the preparation phase are the following:

a) Establish a 6-ink spectral prediction model for predicting the color printed with cross-halftones with three ink surface coverages ($c_P$, $m_P$, $y_P$) laid out in parallel mode and three ink surface coverages ($c_T$, $m_T$, $y_T$) laid out in transverse mode, i.e. predicting the total reflectance $R_{total}(c_P, m_P, y_P, c_T, m_T, y_T)$ as a function of the 6 ink surface coverages ($c_P$, $m_P$, $y_P$, $c_T$, $m_T$, $y_T$). The corresponding calculations are described in Section "Spectral prediction model". The underlying ink-spreading enhanced cellular Yule-Nielsen modified spectral Neugebauer model is adapted to predict the color of line-on-line halftones (FIGS. 10 and 12). The predicted cross-halftone reflectances are converted to colors (e.g. CIELAB) under a certain illuminant, e.g. D65.

b) Establish a 6D cross-halftone surface coverage to color table by establishing the correspondence between the 6 surface coverages formed by $cmy_P = (c_P, m_P, y_P)$ and $cmy_T = (c_T, m_T, y_T)$ and the non-rotated colors $Lab(cmy_P, cmy_T)$ and rotated colors $Lab(cmy_T, cmy_P)$. This is carried out by first obtaining with the spectral prediction model of step (a) for each considered 6 ink surface coverage the reflectance $R_{total}(c_P, m_P, y_P, c_T, m_T, y_T)$ and by converting it to a CIELAB color. The 6 ink surface coverages are varied in steps of e.g. 5%.

c) Establish a 6D desired color table mapping a desired color $Lab_{inNR}$ before rotation and a desired color $Lab_{inR}$ after rotation into an optimal set of 6 ink surface coverages, e.g. ($c_P$, $m_P$, $y_P$, $c_T$, $m_T$, $y_T$), using optimization formula (9).

d) Establish the print gamut and the different constrained color variation sub-gamuts according to Section "Print gamut and constrained color variation sub-gamuts". The print gamut is obtained by the hull of all colors present in the 6D cross-halftone surface coverage to color table. The other sub-gamuts are obtained as described in that section.

e) Separately gamut map input colors (e.g. sRGB) covering the color space to the print gamut, to the constrained color variation sub-gamuts, i.e. the hue varying sub-gamut, the decolorization sub-gamut and the independent color variation sub-gamut, by applying a known gamut mapping technique, e.g. the two-foci gamut mapping algorithm [Morovic and Luo 2001]. This yields the print gamut mapping table, the hue-shifting gamut mapping tables, the decolorization gamut mapping table and the independent color variation gamut mapping table. Each of these tables is a "constrained color variation gamut mapping table".

The steps that are part of the printing phase are the following:

f) The input is specified by two desired input images (e.g. sRGB images), a first desired image in non-rotated mode and a second desired input image in rotated mode. Instead of a colored input image in rotated mode, one may also ask for an achromatic rotated image. One may also ask for two grayscale images, or two independent color images, one in-non-rotated and one in rotated mode. Optionally a ρ value is given to allow for higher chroma values of the obtained non-rotated and rotated hues.

g) Use the gamut mapping tables obtained in step (e) to perform the gamut mapping of the non-rotated input image colors into the constrained color variation sub-gamuts, i.e. into the hue-shifting sub-gamuts, into the decolorization sub-gamut, or into the independent color variation sub-gamut depending if a hue shifted, an achromatic or an independently colored rotated image is desired and in case of a hue-shifted rotated image, depending on the desired ρ value. This step results in two gamut mapped images, one in non-rotated mode and the second in rotate mode.

h) For each pair of corresponding colors from the two gamut mapped images, deduce with the help the 6D desired color table from step (c) the surface coverages of the 6 inks, e.g. ($c_P$, $m_P$, $y_P$, $c_T$, $m_T$, $y_T$).

g) From the 6 ink surface coverages, create the cross-halftoned ink separation layers with the surface coverages ($c_P$, $m_P$, $y_P$) in parallel mode indicating the relative width of the vertical ink lines and the surface coverages in transverse mode ($c_T$, $m_T$, $y_T$) mode indicating the relative width of the horizontal ink lines (see FIG. 14A). Send the resulting halftoned ink separation layers to the printer which will print them on a metallized film or on a metallic substrate, possibly coated with an ink attracting polymer layer.

Computing System for Synthesizing Color Images that Change Colors Upon in-Plane Rotation A computing system for reproducing color images that change colors upon in-plane rotation comprises a CPU, memory, disks and a network interface (FIG. 28) and is operable to run software that comprises callable functions operable to perform the steps described in Section "Steps for producing color images that change their colors upon in-plane rotation" and shown in FIG. 12, i.e. functions which in the preparation phase are operable:

to create and calibrate a 6-ink cross-halftone spectral prediction model for predicting the color printed with cross-halftones with three ink surface coverages ($c_P$, $m_P$, $y_P$) laid out in parallel mode and three ink surface coverages ($c_T$, $m_T$, $y_T$) laid out in transverse mode to establish a 6D cross-halftone surface coverage to color table by expressing the correspondence between the 6 surface coverages formed by $cmy_P=(c_P, m_P, y_P)$ and $cmy_T=(c_T, m_T, y_T)$ and the non-rotated colors Lab ($cmy_P$, $cmy_T$) and rotated colors Lab($cmy_T$, $cmy_P$);

to establish a 6D desired color table mapping a desired color $Lab_{inNR}$ before rotation and a desired color $Lab_{inR}$ after rotation into an optimal set of 6 ink surface coverages, e.g. ($c_P$, $m_P$, $y_P$, $c_T$, $m_T$, $y_T$);

to establish the print gamut, the hue variation sub-gamuts, the decolorization sub-gamut and the independent color variation sub-gamut;

to separately gamut map input colors (e.g. sRGB) to the print gamut, to the constrained color variation sub-gamuts, i.e. the hue variation sub-gamuts, the decolorization sub-gamut and the independent color variation sub-gamut.

The functions in the printing phase are operable to obtain as input two desired images (e.g. sRGB images), a first desired image in non-rotated mode and a second desired input image in rotated mode;

to perform, with the help of the gamut mapping tables established in the preparation phase, the gamut mapping of the non-rotated input image colors into the constrained color variation gamuts, i.e. into the hue-shifting sub-gamuts, the decolorization sub-gamut, or into the independent color variation sub-gamut depending if a hue-shifted, an achromatic or an independently colored rotated image is desired and in case of a hue-shifted rotated image, depending on the desired ρ value;

for each pair of corresponding colors from the two gamut mapped images, to deduce with the previously established 6D desired color table the surface coverages of the 6 inks, e.g. ($c_P$, $m_P$, $y_P$, $c_T$, $m_T$, $y_T$);

from the 6 ink surface coverages, to create the cross-halftoned ink separation layers with the surface coverages ($c_P$, $m_P$, $y_P$) in parallel mode indicating the relative thickness of the vertical ink lines and the surface coverages in transverse mode ($c_T$, $m_T$, $y_T$) mode indicating the relative thickness of the horizontal ink lines to send the resulting halftoned ink separation layers to the printer which prints them on a metallic substrate or on a metallized film.

Viewing the Metallic Prints Showing Hue, Chroma and Lightness Variations when Applying a 90° in Plane Rotation In front of a window or light source, in specular viewing mode, a first color or grayscale image appears on the metallic surface printed with cyan, magenta, yellow inks. Then, upon 90° in plane rotation of the metallic print, either the same image with different colors or a second independent color or grayscale image appears. The succession of these two views upon in-plane rotation of the image identifies the metallic print as authentic. The same succession of two views is obtained upon displacement of the viewing person, see FIG. 2, when the person moves from position 212 to position 213 or vice versa. Best results are obtained under specular viewing conditions. But also under partially diffuse viewing conditions, the succession of color or grayscale images can be observed, possibly with a reduced contrast. In addition, as shown in FIG. 2, it not necessary to observe the print exactly at a 0° or 90° angle in respect to the halftone lines. One may vary the observation angle in respect to the halftone grid by approximately ±25 degrees and still see the corresponding first or second image. FIG. 2 shows a viewing orientation 212 that is not exactly parallel to the transverse halftone lines 214 and perpendicular to the parallel halftone lines 215. Note also that the parallel halftone lines 215 are not exactly parallel to the incident light orientation(s) 211 and the transverse halftone lines 214 are not exactly perpendicular to the incident light orientation(s) 211. Therefore the present invention is well adapted to protect security document that cannot be carefully positioned, for example a parking permit located inside the car, in front of the driver seat, behind the windshield.

Extension of the Presented Methods to Other Ink Colors

The effects that have been described by relying on cyan, magenta, yellow and white inks can also be realized by cyan, magenta and yellow inks, some of them possibly having zero surface coverages, and additional inks such as light cyan, light magenta, gray, light gray, red, green, blue, orange, violet, pink and black inks. Such an extension may also require to extend the color prediction model in order to predict colors printed with cyan, magenta, yellow and with the additional inks.

Embedding Metallic Elements Printed with Transparent Inks, e.g. Cyan, Magenta, Yellow into Security Documents and Valuable Articles Metallic halftone prints may be formed by a base (FIG. 4C, 434) a metallic foil 433, possibly an ink attracting transparent layer 432 and a halftone layer 431 printed with transparent inks, e.g. cyan, magenta, yellow. They can be incorporated into any document e.g. within a small place reserved for special effects on paper banknotes, within a polymer banknote or within one of the layers of a laminated plastic card. The metallic color prints can also be placed on the data page of a passport.

Figure 25A:
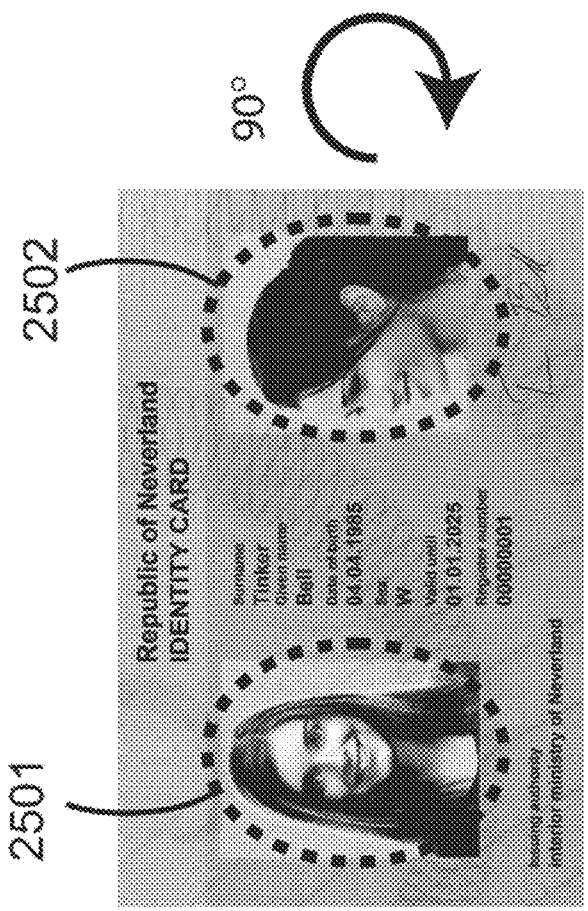
FIG. 25A shows schematically under specular reflection a non-rotated initial identity card image, where the front view of a colored face 2501 appears on the left and the side view of the face, in gray 2502, appears on the right

An identity card may incorporate the reduced size image of the document holder which changes from color to grayscale depending on the rotation mode, see FIGS. 25A and 25B. The color or grayscale picture of the document holder may be seen in one view (2502), e.g. the non-rotated view and be replaced by text (2512) giving the name and birth date of the document holder in the other view, e.g. the rotated view.

A metallic print image may be directly printed on valuable metallic components, such as car engines, aerospace metallic components, weapon components, vehicle components, machine tooling equipment. The area to be printed on a metallic piece is in general covered by an ink attracting layer. Then, with ink-jet, one may print the cross-halftoned ink separations. An additional transparent protective layer may be printed on top of the printed cross-halftone. Under specular reflection, the observed metallic piece will then show a first image before and a second image after 90° in-plane rotation of the printed piece in respect to the observer. These images may incorporate hard to reproduce information, such as different superposed pieces of text as first and second image or different superposed QR-codes as first and second images. Such prints on metal are very difficult to reproduce without the software that is able to generate cross-halftone metallic images.

The metallic print providing the means to authenticate a valuable article can be part of its package or can be part of the label describing the valuable article. For example, a package containing drugs may use as a base the metallic color print, possibly coated with a protecting transparent layer. The metallic color print may incorporate an alphanumeric code or a QR-code that disappears and appears, or that changes from a first code to a second code when rotating the print in-plane by 90°. This code may be used as a further authentication means, by capturing the photograph of the print with a camera hooked onto a computing device such as a smartphone, connecting it to a Web server and verifying that the code (alphanumeric or QR-code) is valid. Another possibility is to print on the metallic sheet e.g. the message "ORIGINAL DRUG" hidden in non-rotated mode and appearing in rotated mode or vice-versa. The message may also be hidden in non-rotated mode by another message (FIGS. 26A, 26B, 26C) or within a picture.

Benefits of the Present Invention

In contrast to many other counterfeit prevention features, metallic prints with hue changing, color to grayscale, grayscale to color varying images or images switching from a first to a second independent image upon quarter turn in plane rotation can be authenticated by the naked eye, without requiring additional devices, such as a smartphone, a camera, a scanner or a UV illumination. These metallic prints cannot be counterfeited without the software optimizing all ink surface coverages in parallel and transverse mode, e.g. the 6 parallel and transverse cyan (c), magenta (m), yellow (y), ink surface coverages. Without this optimization, desired color changes upon in-plane rotation of the print cannot occur and/or strong ghosting effects appear. Ghosting has the effect of showing the two images superposed in both the non-rotated and rotated viewing modes.

If a doubt arises about the authenticity of a document or valuable item incorporating the metallic print with the color varying images, one may examine the cross-halftone metallic print under a microscope and verify that the cross-halftones (FIG. 3, 302) are indeed present, i.e. verify the presence of transverse and parallel line halftones in respect to the incident plane.

Metallic color prints with a color changing image or with a first image switching to a second independent image create surprising effects that can be used in amusement parks, for decoration, for art or for advertisements. For example, a large color metallic poster placed at a position where it is illuminated from one side will show to a person walking by first a non-rotated view and then a rotated view (FIGS. 2, 212 and 213, respectively). The metallic poster then displays in the first view one image and in the second view a second independent image. Or it may show in the first view a color image where the message is hidden and in the second view the same image, but with the hidden message revealed (FIGS. 28A and 28B, right side). Such effects are induced by the change of position of the observing person. This unexpected succession of views raises the attention of the observer.

Metallic color prints with color varying images upon change of the observation conditions have a high decorative value and may be used for the decoration of house walls, museum walls, exhibitions, and of goods having a high symbolic value such as cars, watches, jewelry, smartphones, tablets, portable computers, fashion articles, toys, expensive drinks and cosmetic articles.

The invention claimed is:

1. A method for embedding two input color images on the same area of a metallic print with cross-halftones that comprise two intersecting line halftones, the first input color image being viewable in non-rotated viewing mode and the second input color image being viewable in rotated viewing mode, that is, after an in-plane quarter turn rotation, the method comprising a preparation and a printing phase, where the preparation phase comprises the steps of:

(i) establishing a color prediction model predicting under specular viewing conditions the colors of said cross-halftones in non-rotated and rotated viewing modes as a function of ink surface coverages of said intersecting line halftones;

(ii) creating a multi-dimensional desired color table mapping a first desired color in non-rotated viewing mode and a second desired color in rotated viewing mode to the ink surface coverages of the cross-halftone by minimizing with said color prediction model a difference metric between desired and achieved colors in non-rotated viewing mode and desired and achieved color in rotated viewing mode;

(iii) computing at least one sub-gamut under specular viewing conditions containing colors that are printable and that provides freedom for color changes from gamut mapped colors of said first input image to gamut mapped colors of said second input image;

and where the printing phase comprises the steps of
  (a) performing the gamut mapping of colors from said first input color image into said sub-gamut and of colors from said second input color image into said sub-gamut;
  (b) deducing, for each pair of colors from the first and second gamut mapped images, by accessing the multi-dimensional desired color table from step (ii) the surface coverages of the inks for creating the cross-halftoned ink separation layers;
  (c) with said surface coverages of the inks, creating by halftoning the cross-halftoned ink separation layers; and
  (d) printing said cross-halftoned ink separation layers.

2. The method of claim 1, where after step (i) of establishing the color prediction model, a multi-dimensional cross-halftone surface coverage to color table is created by establishing with said color prediction model the correspondence between the ink surface coverages of said cross-halftones and the resulting colors viewable in non-rotated and rotated viewing modes, where after step (iii) of computing said sub-gamut, colors sampling the space of input colors are mapped to said sub-gamut and form a sub-gamut mapping table, where step (a) of the printing phase is performed with said sub-gamut mapping table, where the inks are the cyan (c), magenta (m), yellow (y) inks, where the intersecting lines halftones forming the cross-halftones are line halftones substantially parallel to the incident light and line halftones substantially transverse to the incident light, where the color prediction model predicting the colors in non-rotated and rotated viewing modes is a 6D ink cross-halftone color prediction model, and where said multi-dimensional cross-halftone surface coverage to color table is a 6D cross-halftone surface coverage to color table.

3. The method of claim 1, where in case that the second input color image differs mainly from the first input color image by hue variations, said sub-gamut is a hue variation sub-gamut, where in case that the second input color image is a grayscale image, said sub-gamut is a decolorization sub-gamut and where in case that the second input color image is independent of the first color image, said sub-gamut is an independent color variation sub-gamut.

4. The method of claim 2, where said 6D ink cross-halftone color prediction model accounts for directional dot gain of the transverse line halftones by relying on an ink-spreading enhanced cellular Yule-Nielsen modified spectral Neugebauer (IS-CYNSN) prediction model specially adapted to predict the reflectance of line-on-line ink halftones, said IS-CYNSN prediction model being calibrated by spectral reflectance measurements of selected line halftones.

5. The method of claim 2, where minimizing with the color prediction model a difference metric between the desired and achieved colors in non-rotated viewing mode and the desired and achieved color in rotated viewing modes is performed with the formula:

$$\{cmy_P, cmy_T\} = \arg\min(\Delta E_{94}(Lab(cmy_P, cmy_T), Lab_{InNR}) + \Delta E_{94}(Lab(cmy_T, cmy_P), Lab_{inR}))$$

Subject to $0 \leq \{c_P, m_P, y_P, c_T, m_T, y_T\} \leq 1$ where $cmy_P$ stands for the nominal surface coverages ($c_P$, $m_P$, $y_P$) of the parallel line halftone, $cmy_T$ stands for the nominal surface coverages ($c_T$, $m_T$, $y_T$) of the transverse line halftone, where $Lab(cmy_P, cmy_T)$ is the color predicted in non-rotated mode by the 6D ink halftone color prediction model, where $Lab(cmy_T, cmy_P)$ is the color predicted in rotated mode by the 6D ink halftone color prediction model, where $Lab_{inNR}$ and $Lab_{inR}$ are the desired colors in non-rotated and rotated modes, respectively and where $\Delta E_{94}$ is a standard color difference formula for calculating color differences in CIELAB space.

6. The method of claim 1, where the first and second images are images selected from the set of color picture, grayscale picture, image showing a text message, image showing an alphanumeric code, image showing a QR code.

7. The method of claim 1, where the print embedding the first and second images is part of a valuable item such as a passport, an identity card, a credit card, a debit card, a personal entry card, a medical card, a diploma, a driving license, a hunting license, a fishing license, an original business document, a classified document, a shipping document, an event ticket, a transportation ticket, a product label, a tax label, a home care product, a beauty product, a health care product, a food product, a beverage product, a pharmaceutical, a drug, an electronic equipment, a valuable metallic component, an aerospace component, an automotive component, a sporting product, a fashion product, a jewellery item, a watch, a compact disk, a DVD, and where the combination of said first and second image protects said valuable item against counterfeits.

8. The method of claim 1, where said cross-halftoned ink separation layers are printed on a transparent plastic layer and where said transparent plastic layer is placed on top of a metallic substrate.

9. The method of claim 8, where said printed transparent plastic layer is placed on top of a metallic substrate by a process selected from pasting, lamination, polymerization, shrink sleeve.

10. The method of claim 1, where said cross-halftoned ink separation layers are printed on a transparent layer and where a metallic layer is formed beneath said printed transparent layer by a metallic particle deposition process selected from vaporization, spraying, electroless plating, and electroplating.

11. The method of claim 1, where the print embedding the first and second images is part of one of the following elements: an advertisement, a piece of art, an amusement park, a floor, a wall, a decoration.

12. A computing system for embedding by cross-halftones two input color images on the same area of a metallic print, the first input color image being viewable under specular reflection in non-rotated viewing mode and the second input color image being viewable under specular reflection in rotated viewing mode, said computing system comprising a CPU, memory, disks and a network interface and running software that comprises predefined callable software functions, which in a preparation phase are operable:
  (i) to calibrate a prediction model predicting under specular viewing conditions colors in non-rotated and rotated viewing modes as a function of ink surface coverages of a cross-halftone formed by intersecting line halftones;
  (ii) to create with said prediction model a multi-dimensional cross-halftone surface coverage to color table by establishing the correspondence between the ink surface coverages and the resulting colors viewable in non-rotated and rotated viewing modes;
  (iii) to create a multi-dimensional desired color table mapping a desired color in non-rotated viewing mode and a desired color in rotated viewing mode to ink surface coverages of the cross-halftone by minimizing with the prediction model a difference metric between the desired and achieved colors in non-rotated viewing mode and the desired and achieved color in rotated viewing modes;

(iv) to compute at least one sub-gamut under specular viewing conditions containing colors that are printable and that provides freedom for color changes from gamut mapped colors of the first input image to gamut mapped colors of the second input image;

(v) to map input colors sampling the space of colors to said sub-gamut and to form with the resulting gamut mapped sampled input colors a corresponding sub-gamut mapping table;

and which in a printing phase are operable (a) to perform with said sub-gamut mapping table the gamut mapping of colors from said first input color image into said sub-gamut and of colors from said second input color image into said sub-gamut, thereby obtaining a first gamut mapped image viewable in non-rotated viewing mode and a second gamut mapped image viewable in rotated viewing mode;

(b) to deduce, for each pair of colors from the first and second gamut mapped images, by accessing the multi-dimensional desired color table, the surface coverages of the inks for creating cross-halftoned ink separation layers;

(c) with said surface coverages of the inks, to create by halftoning the cross-halftoned ink separation layers; and (d) to send said cross-halftoned ink separation layers to the printer.

13. The computing system of claim 12, where the inks are the cyan (c), magenta (m), yellow (y) inks, where the intersecting line halftones forming the cross-halftone are line halftones substantially parallel to the incident light and line halftones substantially transverse to the incident light, where the model predicting the colors in non-rotated and rotated viewing modes is a 6D ink cross-halftone color prediction model, and where said multi-dimensional cross-halftone surface coverage to color table is a 6D cross-halftone surface coverage to color table.

14. The computing system of claim 12, where the first and second images are independent images selected from the set of color picture, grayscale picture, image showing a text message, image showing an alphanumeric code, image showing a QR-code.

15. A metallic print with colored inks embedding two different images covering a same area, said print being formed by cross-halftones, showing under specular viewing conditions a first image and showing under specular viewing conditions after an 90° in-plane rotation a second image, where the main differences between the first image and the second image are from the group of hue variations, decolorizations, recolorizations, and independent color variations.

16. The metallic print of claim 15, which, when observed under a microscope shows two line halftones, one in transverse orientation and one in parallel orientation in respect to the plane of incidence determined by the normal of the print and the viewing direction.

17. The metallic print of claim 15, where the first image shows an element selected from the set of picture, text message, and QR-code, and where the second image shows a different element, selected from the same set.

18. The metallic print of claim 17, with the first and second images form a pair selected from the pairs of color picture and text message, grayscale picture and text message, color picture and grayscale picture, color picture and QR-code, grayscale picture and QR-code, first color picture and second color picture, first text message and second text message, first QR-code and second QR-code.

19. The metallic print of claim 15, where one of the images contains an information selected from the set of text message and QR-code, where a computing device acquires a photograph of said information, where said computing device in case of a text message applies optical character recognition techniques and in case of a QR-code applies QR-code decoding techniques to obtain the information, and where said computing device authenticates the information, possibly by interacting with a remote computing server.

20. The metallic print of claim 15, which is part of a valuable item such as a passport, an identity card, a credit card, a debit card, a personal entry card, a medical card, a diploma, a driving license, a hunting license, a fishing license, an original business document, a classified document, a shipping document, an event ticket, a transportation ticket, a product label, a tax label, a home care product, a beauty product, a health care product, a food product, a beverage product, a pharmaceutical, a drug, an electronic equipment, a valuable metallic component, an aerospace component, an automotive component, a sporting product, a fashion product, a jewellery item, a watch, a compact disk, a DVD, where the combination of said first and second image protects said valuable items against counterfeits.

* * * * *